US012011968B2

(12) United States Patent
Schumacher et al.

(10) Patent No.: US 12,011,968 B2
(45) Date of Patent: Jun. 18, 2024

(54) INTERFACE SYSTEM FOR CONNECTING A VEHICLE AND A TRANSPORT CLIMATE CONTROL SYSTEM

(71) Applicant: THERMO KING LLC, Minneapolis, MN (US)

(72) Inventors: Ryan Wayne Schumacher, Bloomington, MN (US); Mark D. Leasure, Eagan, MN (US); Nicholas Allan Cregan, Roseville, MN (US); Michael James Vanous, Minneapolis, MN (US); Matthew Srnec, Minnetonka, MN (US); Wallace Stephen Hubbard, Chanhassen, MN (US)

(73) Assignee: Thermo King LLC, Minneapolis, MN (US)

( * ) Notice: Subject to any disclaimer, the term of this patent is extended or adjusted under 35 U.S.C. 154(b) by 0 days.

(21) Appl. No.: 17/820,114

(22) Filed: Aug. 16, 2022

(65) Prior Publication Data

US 2022/0388369 A1    Dec. 8, 2022

Related U.S. Application Data

(63) Continuation of application No. 16/565,235, filed on Sep. 9, 2019, now Pat. No. 11,420,495.

(51) Int. Cl.
*B60H 1/00* (2006.01)
*B60H 1/32* (2006.01)
(Continued)

(52) U.S. Cl.
CPC ..... *B60H 1/00428* (2013.01); *B60H 1/00014* (2013.01); *B60H 1/00585* (2013.01);
(Continued)

(58) Field of Classification Search
CPC ........... B60H 1/00428; B60H 1/00014; B60H 1/00585; B60H 1/00985; B60H 1/3208;
(Continued)

(56) References Cited

U.S. PATENT DOCUMENTS 3,875,483 A    4/1975 Farr
5,104,037 A    4/1992 Karg et al.
(Continued)

FOREIGN PATENT DOCUMENTS

CN    2456117    10/2001
CN    1885660    12/2006
(Continued)

OTHER PUBLICATIONS

Extended European Search Report, issued in the corresponding European patent application No. 20195231.4, dated Jan. 28, 2021, 9 pages.
(Continued)

*Primary Examiner* — Nelson J Nieves
(74) *Attorney, Agent, or Firm* — HSML P.C.

(57) ABSTRACT

An interface system for connecting a vehicle and a transport climate control system (TCCS) is disclosed. The interface system includes a two-way communication interface that connects a vehicle electrical system (VES) controller and a TCCS controller. The interface system also includes a power interface that connects a vehicle energy source of the VES to the TCCS and a TCCS energy source of the TCCS to the VES. The two-way communication interface is configured to distribute a TCCS status from the TCCS controller to the VES controller, and is configured to distribute a VES status from the VES controller to the TCCS controller. The power interface is configured to distribute power from the vehicle energy source to the TCCS when a VES instruction is
(Continued)

received, and distribute power from the TCCS energy source to the VES when a TCCS instruction is received.

20 Claims, 12 Drawing Sheets

(51) Int. Cl.
  *B60R 16/03* (2006.01)
  *B60R 16/033* (2006.01)
  *H04L 67/12* (2022.01)
(52) U.S. Cl.
  CPC ....... *B60H 1/00985* (2013.01); *B60H 1/3208* (2013.01); *B60H 1/3222* (2013.01); *B60H 1/3232* (2013.01); *B60R 16/03* (2013.01); *B60R 16/033* (2013.01); *H04L 67/12* (2013.01)
(58) Field of Classification Search
  CPC .... B60H 1/3222; B60H 1/3232; B60R 16/03; B60R 16/033; B60R 16/0231; H04L 67/12
  See application file for complete search history.

(56) References Cited

U.S. PATENT DOCUMENTS

| | | | |
|---|---|---|---|
| 5,231,849 A | 8/1993 | Rosenblatt | |
| 6,280,320 B1 | 8/2001 | Paschke et al. | |
| 6,487,869 B1 | 12/2002 | Sulc et al. | |
| 6,518,727 B2 | 2/2003 | Oomura et al. | |
| 6,560,980 B2 | 5/2003 | Gustafson et al. | |
| 6,600,237 B1 | 7/2003 | Meissner | |
| 6,631,080 B2 | 10/2003 | Trimble et al. | |
| 6,652,330 B1 | 11/2003 | Wasilewski | |
| 6,688,125 B2 | 2/2004 | Okamoto et al. | |
| 6,700,214 B2* | 3/2004 | Ulinski | H02J 7/34 322/17 |
| 6,753,692 B2 | 6/2004 | Toyomura et al. | |
| 6,925,826 B2 | 8/2005 | Hille et al. | |
| 7,011,902 B2 | 3/2006 | Pearson | |
| 7,120,539 B2 | 10/2006 | Krull et al. | |
| 7,122,923 B2 | 10/2006 | Lafontaine et al. | |
| 7,151,326 B2 | 12/2006 | Jordan | |
| 7,176,658 B2 | 2/2007 | Quazi et al. | |
| 7,206,692 B2 | 4/2007 | Beesley et al. | |
| 7,327,123 B2 | 2/2008 | Faberman et al. | |
| 7,424,343 B2 | 9/2008 | Kates | |
| 7,449,798 B2 | 11/2008 | Suzuki et al. | |
| 7,532,960 B2 | 5/2009 | Kumar | |
| 7,728,546 B2 | 6/2010 | Tanaka et al. | |
| 7,730,981 B2 | 6/2010 | McCabe et al. | |
| 7,745,953 B2 | 6/2010 | Puccetti et al. | |
| 7,806,796 B2 | 10/2010 | Zhu | |
| 7,830,117 B2 | 11/2010 | Ambrosio et al. | |
| 7,898,111 B1 | 3/2011 | Pistel | |
| 7,900,462 B2 | 3/2011 | Hegar et al. | |
| 8,020,651 B2 | 9/2011 | Zillmer et al. | |
| 8,030,880 B2 | 10/2011 | Alston et al. | |
| 8,134,339 B2 | 3/2012 | Burlak et al. | |
| 8,170,886 B2 | 5/2012 | Luff | |
| 8,214,141 B2 | 7/2012 | Froeberg | |
| 8,295,950 B1* | 10/2012 | Wordsworth | B60H 1/3232 700/297 |
| 8,381,540 B2 | 2/2013 | Alston | |
| 8,441,228 B2 | 5/2013 | Brabec | |
| 8,476,872 B2 | 7/2013 | Truckenbrod et al. | |
| 8,487,458 B2 | 7/2013 | Steele et al. | |
| 8,541,905 B2 | 9/2013 | Brabec | |
| 8,602,141 B2 | 12/2013 | Yee et al. | |
| 8,626,367 B2 | 1/2014 | Krueger et al. | |
| 8,626,419 B2 | 1/2014 | Mitchell et al. | |
| 8,643,216 B2 | 2/2014 | Lattin | |
| 8,643,217 B2 | 2/2014 | Gietzold et al. | |
| 8,670,225 B2 | 3/2014 | Nunes | |
| 8,723,344 B1 | 5/2014 | Dierickx | |
| 8,742,620 B1 | 6/2014 | Brennan et al. | |
| 8,760,115 B2 | 6/2014 | Kinser et al. | |
| 8,764,469 B2 | 7/2014 | Lamb | |
| 8,767,379 B2 | 7/2014 | Whitaker | |
| 8,818,588 B2 | 8/2014 | Ambrosio et al. | |
| 8,862,356 B2 | 10/2014 | Miller | |
| 8,912,683 B2 | 12/2014 | Dames et al. | |
| 8,924,057 B2 | 12/2014 | Kinser et al. | |
| 8,978,798 B2 | 5/2015 | Dalum et al. | |
| 9,030,336 B2 | 5/2015 | Doyle | |
| 9,061,680 B2 | 6/2015 | Dalum | |
| 9,093,788 B2 | 7/2015 | Lamb | |
| 9,102,241 B2 | 8/2015 | Brabec | |
| 9,147,335 B2 | 9/2015 | Raghunathan et al. | |
| 9,199,543 B2 | 12/2015 | Brabec | |
| 9,313,616 B2 | 4/2016 | Mitchell et al. | |
| 9,436,853 B1 | 9/2016 | Meyers | |
| 9,440,507 B2 | 9/2016 | Giovanardi et al. | |
| 9,463,681 B2 | 10/2016 | Olaleye et al. | |
| 9,464,839 B2 | 10/2016 | Rusignuolo et al. | |
| 9,557,100 B2 | 1/2017 | Chopko et al. | |
| 9,562,715 B2 | 2/2017 | Kandasamy | |
| 9,694,697 B2 | 7/2017 | Brabec | |
| 9,738,160 B2 | 8/2017 | Bae et al. | |
| 9,758,013 B2 | 9/2017 | Steele | |
| 9,783,024 B2 | 10/2017 | Connell et al. | |
| 9,784,780 B2 | 10/2017 | Loftus et al. | |
| 9,825,549 B2 | 11/2017 | Choi et al. | |
| 9,846,086 B1 | 12/2017 | Robinson et al. | |
| 9,893,545 B2 | 2/2018 | Bean | |
| 9,931,960 B2 | 4/2018 | Tabatowski-Bush et al. | |
| 9,975,403 B2 | 5/2018 | Rusignuolo et al. | |
| 9,975,446 B2 | 5/2018 | Weber et al. | |
| 9,987,906 B2* | 6/2018 | Kennedy | B60H 1/3232 |
| 10,000,122 B2 | 6/2018 | Wu et al. | |
| 10,148,212 B2 | 12/2018 | Schumacher et al. | |
| 10,240,847 B1* | 3/2019 | Thomas, Jr. | F25D 11/003 |
| 10,428,844 B1* | 10/2019 | Holt | B60P 3/20 |
| 10,875,497 B2* | 12/2020 | Srnec | B60L 1/003 |
| 10,995,760 B1* | 5/2021 | Stubbs | B60P 3/225 |
| 11,034,213 B2* | 6/2021 | Wenger | B60H 1/00364 |
| 2002/0113576 A1 | 8/2002 | Oomura et al. | |
| 2003/0043607 A1 | 3/2003 | Vinciarelli et al. | |
| 2003/0106332 A1* | 6/2003 | Okamoto | F25B 27/00 62/239 |
| 2003/0200017 A1 | 10/2003 | Capps et al. | |
| 2003/0201097 A1 | 10/2003 | Zeigler et al. | |
| 2004/0168455 A1* | 9/2004 | Nakamura | B60H 1/00428 62/323.3 |
| 2005/0057210 A1 | 3/2005 | Ueda et al. | |
| 2005/0065684 A1* | 3/2005 | Larson | B60R 16/03 701/1 |
| 2006/0284601 A1 | 12/2006 | Salasoo et al. | |
| 2007/0052241 A1 | 3/2007 | Pacy | |
| 2007/0192116 A1 | 8/2007 | Levitt | |
| 2008/0147270 A1* | 6/2008 | Sakane | B60H 1/00864 700/300 |
| 2008/0177678 A1 | 7/2008 | Di Martini et al. | |
| 2008/0281473 A1 | 11/2008 | Pitt | |
| 2009/0121798 A1 | 5/2009 | Levinson | |
| 2009/0122901 A1 | 5/2009 | Choi et al. | |
| 2009/0126901 A1* | 5/2009 | Hegar | B60H 1/00507 180/311 |
| 2009/0178424 A1 | 7/2009 | Hwang et al. | |
| 2009/0195349 A1 | 8/2009 | Frader-Thompson et al. | |
| 2009/0228155 A1 | 9/2009 | Slifkin et al. | |
| 2009/0314019 A1 | 12/2009 | Fujimoto et al. | |
| 2009/0320515 A1 | 12/2009 | Bischofberger et al. | |
| 2010/0045105 A1 | 2/2010 | Bovio et al. | |
| 2010/0230224 A1 | 9/2010 | Hindman | |
| 2010/0312425 A1 | 12/2010 | Obayashi et al. | |
| 2010/0320018 A1 | 12/2010 | Gwozdek et al. | |
| 2011/0000244 A1 | 1/2011 | Reason et al. | |
| 2011/0114398 A1 | 5/2011 | Bianco | |
| 2011/0118916 A1 | 5/2011 | Gullichsen | |
| 2011/0162395 A1* | 7/2011 | Chakiachvili | B60H 1/3226 62/236 |

(56) References Cited

U.S. PATENT DOCUMENTS

| | | |
|---|---|---|
| 2011/0208378 A1 | 8/2011 | Krueger et al. |
| 2011/0224841 A1 | 9/2011 | Profitt-Brown et al. |
| 2011/0241420 A1 | 10/2011 | Hering et al. |
| 2011/0290893 A1 | 12/2011 | Steinberg |
| 2012/0000212 A1 | 1/2012 | Sanders et al. |
| 2012/0116931 A1 | 5/2012 | Meyers |
| 2012/0153722 A1 | 6/2012 | Nazarian |
| 2012/0167605 A1* | 7/2012 | Ikemiya ............... F25D 11/003 62/126 |
| 2012/0198866 A1 | 8/2012 | Zeidner |
| 2012/0310376 A1 | 12/2012 | Krumm et al. |
| 2012/0310416 A1 | 12/2012 | Tepper et al. |
| 2013/0000342 A1 | 1/2013 | Blasko et al. |
| 2013/0073094 A1 | 3/2013 | Knapton et al. |
| 2013/0088900 A1 | 4/2013 | Park |
| 2013/0158828 A1 | 6/2013 | McAlister |
| 2013/0231808 A1 | 9/2013 | Flath et al. |
| 2014/0018969 A1 | 1/2014 | Forbes, Jr. |
| 2014/0020414 A1 | 1/2014 | Rusignuolo et al. |
| 2014/0026599 A1 | 1/2014 | Rusignuolo et al. |
| 2014/0060097 A1 | 3/2014 | Perreault |
| 2014/0137590 A1 | 5/2014 | Chopko et al. |
| 2014/0230470 A1 | 8/2014 | Cook |
| 2014/0265560 A1 | 9/2014 | Leehey et al. |
| 2014/0283533 A1* | 9/2014 | Kurtzman ............... B60R 16/03 307/130 |
| 2015/0019132 A1 | 1/2015 | Gusikhin et al. |
| 2015/0081212 A1 | 3/2015 | Mitchell et al. |
| 2015/0121923 A1 | 5/2015 | Rusignuolo et al. |
| 2015/0168032 A1 | 6/2015 | Steele |
| 2015/0188360 A1 | 7/2015 | Doane et al. |
| 2015/0231948 A1* | 8/2015 | Kennedy ............ B60H 1/00428 62/243 |
| 2015/0246593 A1* | 9/2015 | Larson ............... B60H 1/00428 62/236 |
| 2015/0306937 A1 | 10/2015 | Kitamura et al. |
| 2015/0316301 A1 | 11/2015 | Kolda et al. |
| 2015/0345958 A1* | 12/2015 | Graham ................ B60W 10/30 701/22 |
| 2015/0355288 A1 | 12/2015 | Yokoyama et al. |
| 2015/0360568 A1 | 12/2015 | Champagne et al. |
| 2016/0011001 A1 | 1/2016 | Emory et al. |
| 2016/0035152 A1 | 2/2016 | Kargupta |
| 2016/0089994 A1 | 3/2016 | Keller et al. |
| 2016/0144764 A1 | 5/2016 | Dutta et al. |
| 2016/0252289 A1 | 9/2016 | Feng et al. |
| 2016/0280040 A1 | 9/2016 | Connell et al. |
| 2016/0285416 A1 | 9/2016 | Tiwari et al. |
| 2016/0291622 A1 | 10/2016 | Al-Mohssen et al. |
| 2016/0327921 A1 | 11/2016 | Ribbich et al. |
| 2016/0377309 A1 | 12/2016 | Abiprojo et al. |
| 2017/0030728 A1 | 2/2017 | Baglino et al. |
| 2017/0057323 A1 | 3/2017 | Neu et al. |
| 2017/0063248 A1 | 3/2017 | Lee et al. |
| 2017/0098954 A1 | 4/2017 | Ferguson et al. |
| 2017/0217280 A1 | 8/2017 | Larson et al. |
| 2017/0259764 A1 | 9/2017 | Da Silva Carvalho et al. |
| 2017/0282711 A1 | 10/2017 | Quill et al. |
| 2017/0302200 A1* | 10/2017 | Marcinkiewicz ..... F25B 49/025 |
| 2017/0349078 A1 | 12/2017 | Dziuba et al. |
| 2018/0022187 A1 | 1/2018 | Connell et al. |
| 2018/0029436 A1* | 2/2018 | Zaeri ................... B60H 1/3232 |
| 2018/0029488 A1 | 2/2018 | Sjödin |
| 2018/0087813 A1 | 3/2018 | Senf, Jr. |
| 2018/0111441 A1 | 4/2018 | Menard et al. |
| 2018/0154723 A1 | 6/2018 | Anderson et al. |
| 2018/0186317 A1 | 7/2018 | Srnec et al. |
| 2018/0201092 A1 | 7/2018 | Ahuja et al. |
| 2018/0203443 A1 | 7/2018 | Newman |
| 2018/0222278 A1 | 8/2018 | Mizuma |
| 2018/0306533 A1 | 10/2018 | Alahyari et al. |
| 2018/0334012 A1* | 11/2018 | Geller ............... B60H 1/00428 |
| 2018/0342876 A1 | 11/2018 | Agnew et al. |
| 2018/0342877 A1 | 11/2018 | Yoo et al. |
| 2018/0356870 A1 | 12/2018 | Rusignuolo |
| 2019/0047496 A1 | 2/2019 | Sufrin-Disler et al. |
| 2019/0086138 A1 | 3/2019 | Chopko et al. |
| 2019/0092122 A1* | 3/2019 | Vanous .............. B60H 1/00428 |
| 2019/0123544 A1 | 4/2019 | Pelegris et al. |
| 2019/0184838 A1 | 6/2019 | Lee et al. |
| 2019/0255914 A1 | 8/2019 | Ikeda et al. |
| 2019/0283541 A1 | 9/2019 | Adetola et al. |
| 2019/0308487 A1 | 10/2019 | Badger, II et al. |
| 2020/0050753 A1 | 2/2020 | Davis et al. |
| 2020/0076029 A1 | 3/2020 | Litz |
| 2020/0086744 A1 | 3/2020 | Schumacher et al. |
| 2020/0101820 A1 | 4/2020 | Wenger et al. |
| 2020/0106271 A1* | 4/2020 | Rydkin .................... B60P 3/20 |
| 2020/0130471 A1 | 4/2020 | Leasure |
| 2020/0130473 A1 | 4/2020 | Schumacher et al. |
| 2020/0136504 A1 | 4/2020 | Schumacher et al. |
| 2020/0207184 A1 | 7/2020 | Schumacher et al. |
| 2020/0217577 A1* | 7/2020 | Renikuntla ........ B60H 1/00985 |
| 2021/0061105 A1 | 3/2021 | Bates et al. |
| 2021/0061156 A1* | 3/2021 | Swab ...................... B60D 1/62 |

FOREIGN PATENT DOCUMENTS

| | | |
|---|---|---|
| CN | 2912069 | 6/2007 |
| CN | 101713577 | 5/2010 |
| CN | 202038315 | 11/2011 |
| CN | 103287279 | 9/2013 |
| CN | 104539184 | 4/2015 |
| CN | 104734178 | 6/2015 |
| CN | 105711376 | 6/2016 |
| CN | 106184252 | 12/2016 |
| CN | 106766419 | 5/2017 |
| CN | 106774131 | 5/2017 |
| CN | 107415642 | 12/2017 |
| CN | 108074466 | 5/2018 |
| CN | 108931006 | 12/2018 |
| CN | 208306320 | 1/2019 |
| CN | 208650989 | 3/2019 |
| DE | 3817365 | 11/1989 |
| DE | 29715576 | 12/1997 |
| DE | 10138750 | 2/2003 |
| DE | 10200637 | 10/2003 |
| DE | 102011050719 | 12/2012 |
| EP | 0282051 | 9/1988 |
| EP | 1935712 | 6/2008 |
| EP | 2365915 | 9/2011 |
| EP | 2689944 | 1/2014 |
| EP | 2717016 | 9/2014 |
| EP | 2942216 | 11/2015 |
| EP | 3343728 | 7/2018 |
| EP | 536552 | 9/2019 |
| EP | 3540340 | 9/2019 |
| GB | 2551999 | 1/2018 |
| JP | 2000158930 | 6/2000 |
| JP | 2007320352 | 12/2007 |
| JP | 2009243780 | 10/2009 |
| JP | 2019145521 | 8/2019 |
| KR | 10-2012-0092834 | 8/2012 |
| WO | 03038988 | 5/2003 |
| WO | 2008/153518 | 12/2008 |
| WO | 2009/155941 | 12/2009 |
| WO | 2010065476 | 6/2010 |
| WO | 2011066468 | 6/2011 |
| WO | 2011/094099 | 8/2011 |
| WO | 2012/138500 | 10/2012 |
| WO | 2012138497 | 10/2012 |
| WO | 2013096084 | 6/2013 |
| WO | 2014002244 | 1/2014 |
| WO | 2014058610 | 4/2014 |
| WO | 2014085672 | 6/2014 |
| WO | 2014106060 | 7/2014 |
| WO | 2014106068 | 7/2014 |
| WO | 2016/038838 | 3/2016 |
| WO | 2016145107 | 9/2016 |
| WO | 2017058660 | 4/2017 |
| WO | 2017/083333 | 5/2017 |
| WO | 2017/083336 | 5/2017 |
| WO | 2017/151698 | 9/2017 |

(56) References Cited

FOREIGN PATENT DOCUMENTS

| WO | 2017172484 | 10/2017 |
| --- | --- | --- |
| WO | 2017172855 | 10/2017 |
| WO | 2017176682 | 10/2017 |
| WO | 2017176725 | 10/2017 |
| WO | 2017176729 | 10/2017 |
| WO | 2017189485 | 11/2017 |
| WO | 2017218909 | 12/2017 |
| WO | 2017218910 | 12/2017 |
| WO | 2017218912 | 12/2017 |
| WO | 2018/017450 | 1/2018 |
| WO | 2018009646 | 1/2018 |
| WO | 2018009798 | 1/2018 |
| WO | 2018017818 | 1/2018 |
| WO | 2018029502 | 2/2018 |
| WO | 2018226389 | 12/2018 |
| WO | 2018226649 | 12/2018 |
| WO | 2018226848 | 12/2018 |
| WO | 2018226857 | 12/2018 |
| WO | 2018226862 | 12/2018 |
| WO | 2018226906 | 12/2018 |
| WO | 2018226981 | 12/2018 |
| WO | 2018226986 | 12/2018 |
| WO | 2019051086 | 3/2019 |
| WO | 2019151947 | 8/2019 |
| WO | 2020068446 | 4/2020 |
| WO | 2020068450 | 4/2020 |
| WO | 2020068469 | 4/2020 |
| WO | 2020068475 | 4/2020 |
| WO | 2020068502 | 4/2020 |
| WO | 2020068556 | 4/2020 |
| WO | 2020068641 | 4/2020 |
| WO | 2020068646 | 4/2020 |
| WO | 2020069107 | 4/2020 |

OTHER PUBLICATIONS

Yang et al., "The Role of Thermal Plume in Person-to-Person Contaminant Cross Transmission", 2017 Winter Conference, Seminar 36; Modeling and Control of the Personal Microenvironment, 5 pages.
"Lamberet Smart Reefer on Solutrans", Zoeken, Jul. 28, 2015, 7 pages, available at: https://iepieleaks.nl/lamberet-smart-reefer-solutrans/.
U.S. Appl. No. 16/178,067, titled "Methods and Systems for Generation and Utilization of Supplemental Stored Energy for Use in Transport Climate Control", filed Nov. 1, 2018, 35 pages.
U.S. Appl. No. 16/565,063, titled "System and Method for Managing Power and Efficiently Sourcing a Variable Voltage for a Transport Climate Control System", filed Sep. 9, 2019, 59 pages.
U.S. Appl. No. 16/574,754, titled "Methods and Systems for Energy Management of a Transport Climate Control System", filed Sep. 18, 2019, 50 pages.
U.S. Appl. No. 16/574,775, titled "Methods and Systems for Power and Load Management of a Transport Climate Control System", filed Sep. 18, 2019, 68 pages.
European Patent Application No. 18382672.6, titled "Methods and Systems for Energy Management of a Transport Climate Control System", filed Sep. 19, 2018, 50 pages.
European Patent Application No. 18382673.4 titled "Methods and Systems for Power and Load Management of a Transport Climate Control System", filed Sep. 19, 2018, 68 pages.
U.S. Appl. No. 16/176,802, titled "Methods and Systems for Controlling a Mild Hybrid System That Powers a Transport Climate Control System", filed Oct. 31, 2018, 31 pages.
U.S. Appl. No. 16/236,938, titled "Systems and Methods for Smart Load Shedding of a Transport Vehicle While in Transit", filed Dec. 31, 2018, 39 pages.
U.S. Appl. No. 16/176,720, titled "Methods and Systems for Augmenting a Vehicle Powered Transport Climate Control System", filed Oct. 31, 2018, 41 pages.
U.S. Appl. No. 16/176,602, titled "Reconfigurable Utility Power Input With Passive Voltage Booster", filed Oct. 31, 2018, 39 pages.
U.S. Appl. No. 16/147,704, titled "Methods and Systems for Monitoring and Displaying Energy Use and Energy Cost of a Transport Vehicle Climate Control System or a Fleet of Transport Vehicle Climate Control Systems", filed Sep. 29, 2018, 33 pages.
U.S. Appl. No. 16/235,865, titled "Methods and Systems for Preserving Autonomous Operation of a Transport Climate Control System", filed Dec. 28, 2018, 41 pages.
PCT International Application No. PCT/US2018/068136, titled "Methods and Systems for Providing Predictive Energy Consumption Feedback for Powering a Transport Climate Control System", filed Dec. 31, 2018, 34 pages.
PCT International Application No. PCT/US2018/068129, titled "Methods and Systems for Notifying and Mitigating a Suboptimal Event Occurring in a Transport Climate Control System", filed Dec. 31, 2018, 44 pages.
PCT International Application No. PCT/US2018/068139, titled "Methods and Systems for Providing Feedback for a Transport Climate Control System", filed Dec. 31, 2018, 37 pages.
PCT International Application No. PCT/US2018/068142, titled "Methods and Systems for Providing Predictive Energy Consumption Feedback for Powering a Transport Climate Control System Using External Data", filed Dec. 31, 2018, 39 pages.
U.S. Appl. No. 16/911,692, titled "Climate Controlled Vehicle, Transport Climate Control Equipment, Method of Retrofitting a Vehicle and Method of Operation", filed Jun. 25, 2020, 39 pages.
U.S. Appl. No. 16/565,205, titled "Transport Climate Control System With an Accessory Power Distribution Unit for Managing Transport Climate Control Loads", filed Sep. 9, 2019, 57 pages.
U.S. Appl. No. 16/565,110, titled "Transport Climate Control System With a Self-Configuring Matrix Power Converter", filed Sep. 9, 2019, 52 pages.
U.S. Appl. No. 62/897,833, titled "Optimized Power Distribution to Transport Climate Control Systems Amongst One or More Electric Supply Equipment Stations", filed Sep. 9, 2019, 41 pages.
European Patent Application No. 19382776.3, titled "Mprioritized Power Delivery for Facilitating Transport Climate Control", filed Sep. 9, 2019, 41 pages.
U.S. Appl. No. 16/565,282, titled "Optimized Power Cord for Transferring Power to a Transport Climate Control System", filed Sep. 9, 2019, 43 pages.
U.S. Appl. No. 16/565,146, titled "Optimized Power Management for a Transport Climate Control Energy Source", filed Sep. 9, 2019, 53 pages.
U.S. Appl. No. 16/565,252, titled "Demand-Side Power Distribution Management for a Plurality of Transport Climate Control Systems", filed Sep. 9, 2019, 44 pages.
U.S. Appl. No. 17/015,190, titled "Optimized Power Distribution To Transport Climate Control Systems Amongst One or More Electric Supply Equipment Stations", filed Sep. 9, 2020, 43 pages.
U.S. Appl. No. 16/147,708, titled "Methods and Systems for Autonomous Climate Control Optimization of a Transport Vehicle", filed Sep. 29, 2018, 41 pages.
U.S. Appl. No. 16/176,667, titled "Drive off Protection System and Method for Preventing Drive Off", filed Oct. 31, 2018, 41 pages.
U.S. Appl. No. 16/730,126, titled "Transport Climate Control System Power Architecture", filed Dec. 30, 2019, 27 pages.
U.S. Appl. No. 17/015,194, titled "Prioritized Power Delivery for Facilitating Transport Climate Control", filed Sep. 9, 2020, 41 pages.
First Chinese Office Action and Search Report, issued in the corresponding Chinese patent application number 20201095009.0, dated Apr. 8, 2024, 16 pages (including machine translation).

* cited by examiner

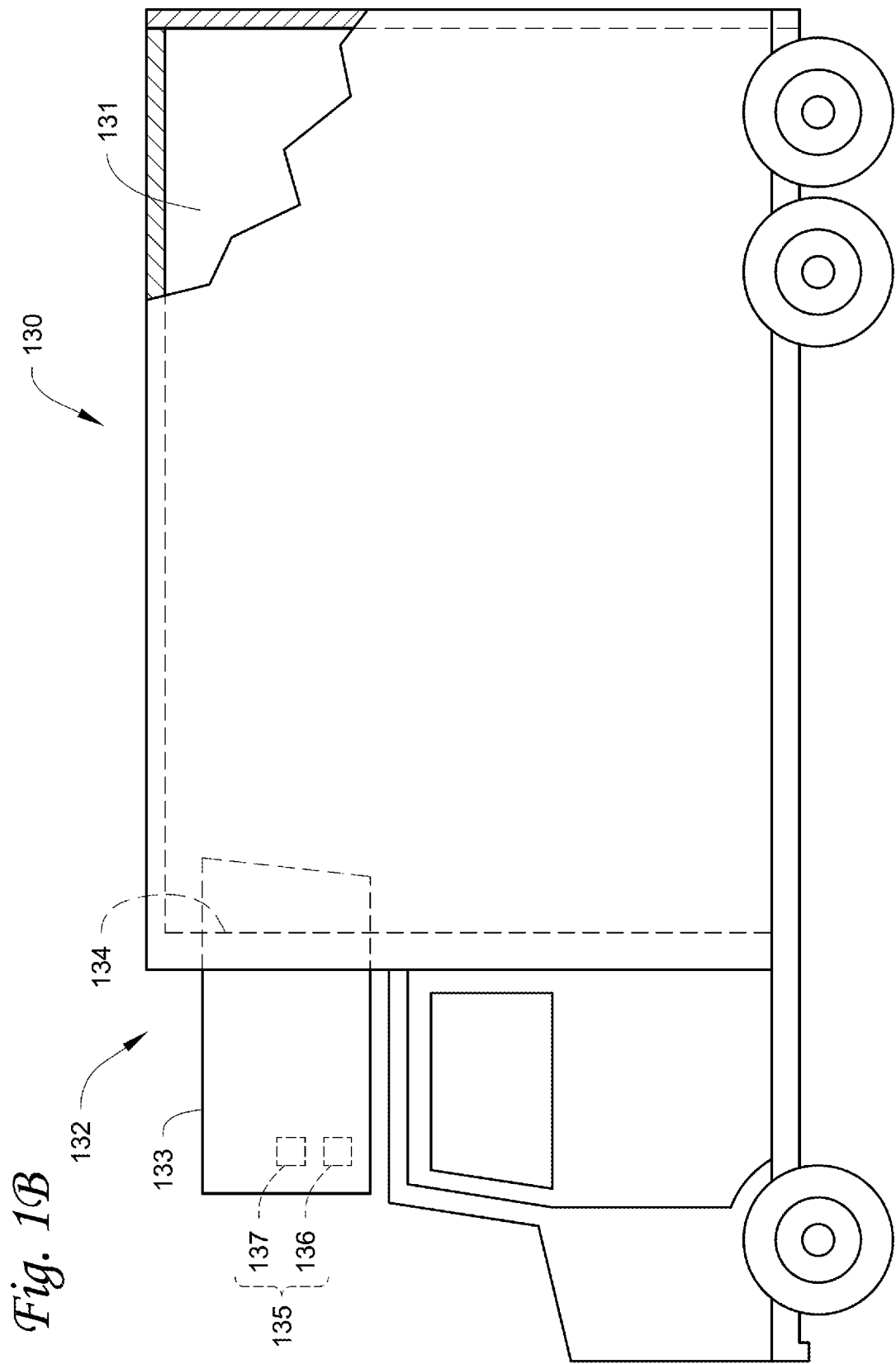

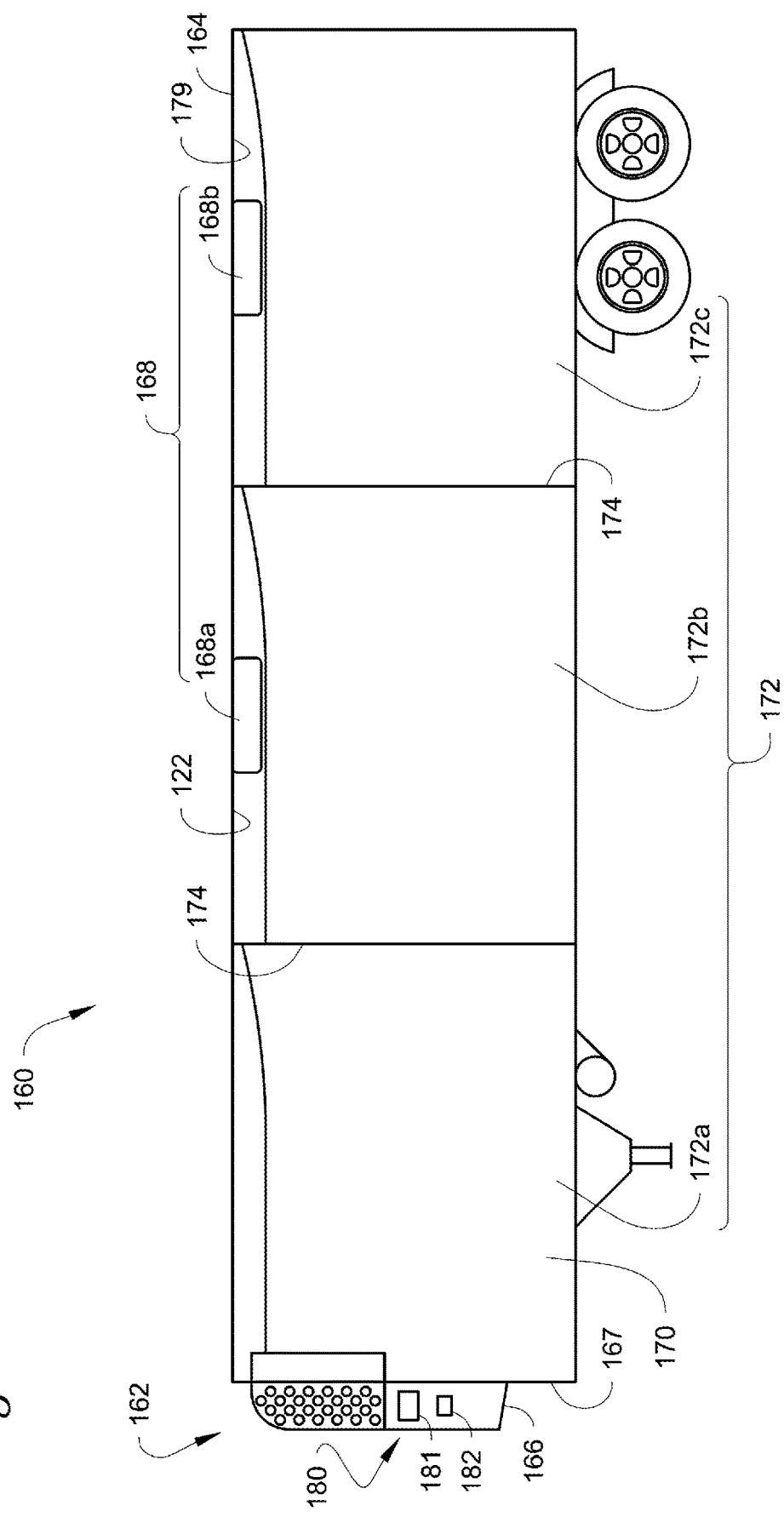

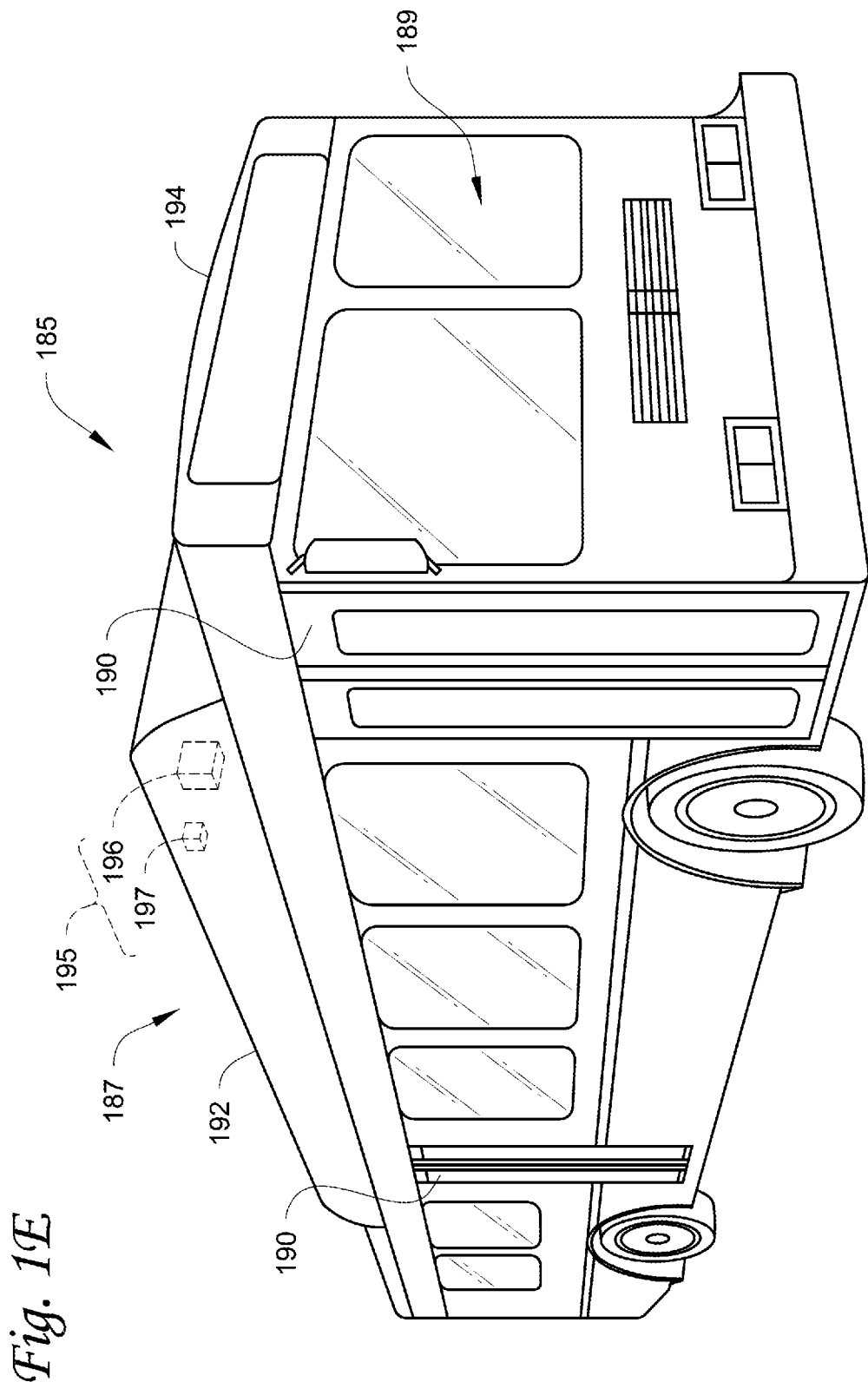

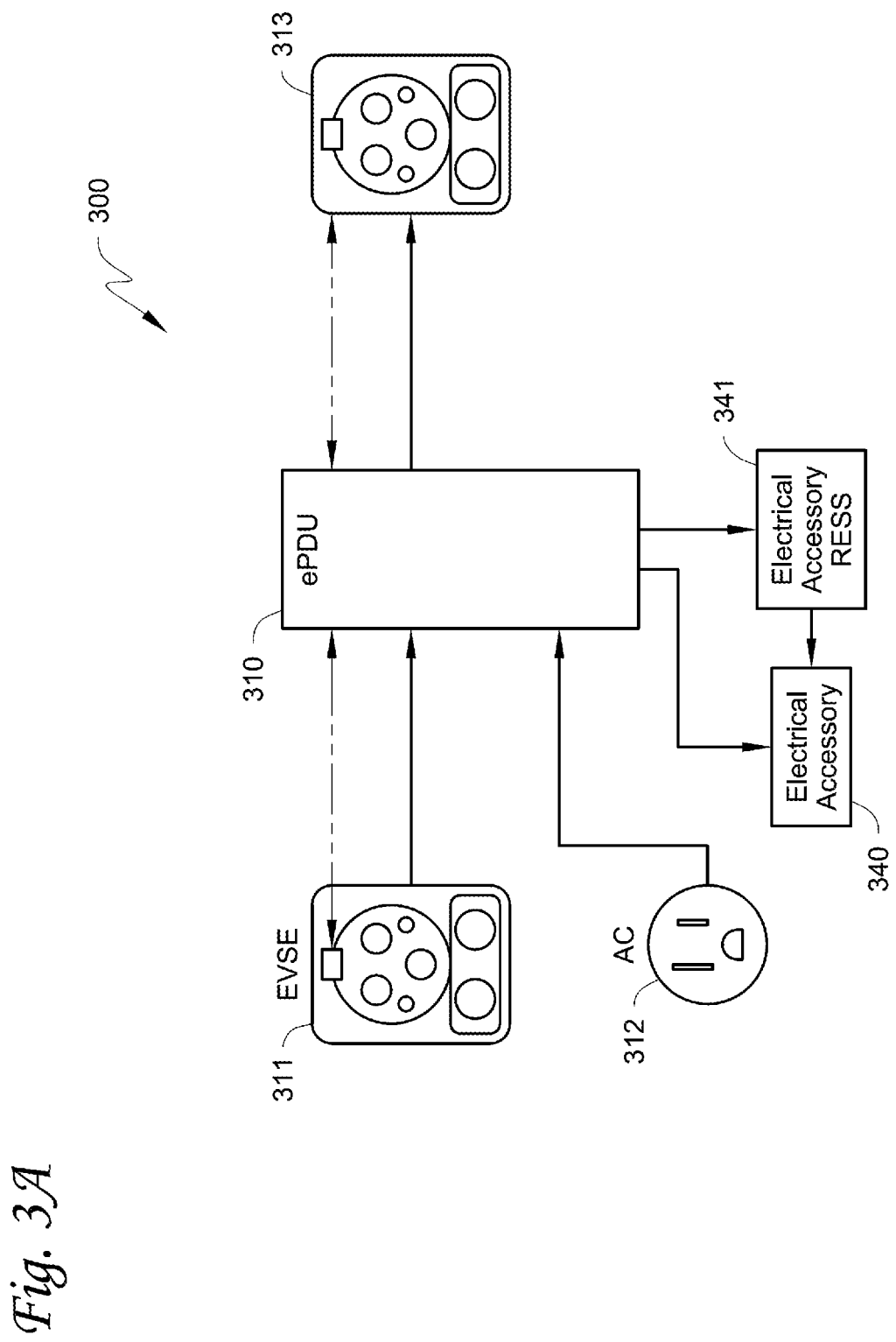

INTERFACE SYSTEM FOR CONNECTING A VEHICLE AND A TRANSPORT CLIMATE CONTROL SYSTEM

FIELD

This disclosure relates generally to an electrically powered accessory configured to be used with at least one of a vehicle, trailer, and a transport container. More specifically, the disclosure relates to a two-way interface system for connecting a vehicle and an electrically powered accessory that provides climate control within an internal space moved by the vehicle.

BACKGROUND

A transport climate control system is generally used to control environmental condition(s) (e.g., temperature, humidity, air quality, and the like) within a climate controlled space of a transport unit (e.g., a truck, a container (such as a container on a flat car, an intermodal container, etc.), a box car, a semi-tractor, a bus, or other similar transport unit). The transport climate control system can include, for example, a transport refrigeration system (TRS) and/or a heating, ventilation and air conditioning (HVAC) system. The TRS can control environmental condition(s) within the climate controlled space to maintain cargo (e.g., produce, frozen foods, pharmaceuticals, etc.). The HVAC system can control environmental conditions(s) within the climate controlled space to provide passenger comfort for passengers travelling in the transport unit. In some transport units, the transport climate control system can be installed externally (e.g., on a rooftop of the transport unit, on a front wall of the transport unit, etc.).

SUMMARY

This disclosure relates generally to an electrically powered accessory configured to be used with at least one of a vehicle, trailer, and a transport container. More specifically, the disclosure relates to a two-way interface system for connecting a vehicle and an electrically powered accessory.

In some embodiments, the electrically powered accessory can be a transport climate control system that provides climate control within an internal space moved by the vehicle. In these embodiments, an interface system for communicating with a vehicle and a transport climate control system (TCCS) that provides climate control within an internal space moved by the vehicle is disclosed. The interface system includes a two-way communication interface that interfaces with a vehicle electrical system (VES) controller of a VES of the vehicle and a TCCS controller of the TCCS. The interface system also includes a power interface that interfaces with a vehicle energy source of the VES to the TCCS. The two-way communication interface is configured to distribute a TCCS status from the TCCS controller to the VES controller, and is configured to distribute a VES status from the VES controller to the TCCS controller. The power interface is configured to distribute power from the vehicle energy source of the VES to the TCCS when a VES instruction, that is based on the TCCS status, is received from the VES controller.

In one embodiment, a method for interfacing between a vehicle and a transport climate control system (TCCS) that provides climate control within an internal space moved by the vehicle is disclosed. The method includes a two-way communication interface communicating with a vehicle electrical system (VES) controller of a VES of the vehicle. The method also includes the two-way communication interface communicating with a TCCS controller of the TCCS. The method further includes a power interface interfacing with a vehicle energy source of the VES. Also the method includes the two-way communication interface distributing a TCCS status from the TCCS controller to the VES controller and/or distributing a VES status from the VES controller to the TCCS controller. The method also includes the power interface distributing power from the vehicle energy source to the TCCS when a VES instruction, that is based on the TCCS status, is received from the VES controller.

In one embodiment, an interface system for communicating with a vehicle and an electrically powered accessory (EPA) is disclosed. The EPA is configured to be used with at least one of the vehicle, a trailer, and a transportation container. The interface system includes a two-way communication interface that interfaces with a vehicle electrical system (VES) controller of a VES of the vehicle and an EPA controller of the EPA. The interface system also includes a power interface that interfaces with a vehicle energy source of the VES to the EPA. The two-way communication interface is configured to distribute an EPA status from the EPA controller to the VES controller, and is configured to distribute a VES status from the VES controller to the EPA controller. The power interface is configured to distribute power from the vehicle energy source of the VES to the EPA when a VES instruction, that is based on the EPA status, is received from the VES controller.

In one embodiment, a method for interfacing between a vehicle and an electrically powered accessory (EPA) is disclosed. The EPA is configured to be used with at least one of the vehicle, a trailer, and a transportation container. The method includes a two-way communication interface communicating with a vehicle electrical system (VES) controller of a VES of the vehicle. The method also includes the two-way communication interface communicating with an EPA controller of the EPA. The method further includes a power interface interfacing with a vehicle energy source of the VES. Also the method includes the two-way communication interface distributing an EPA status from the EPA controller to the VES controller and/or distributing a VES status from the VES controller to the EPA controller. The method also includes the power interface distributing power from the vehicle energy source to the EPA when a VES instruction, that is based on the EPA status, is received from the VES controller.

BRIEF DESCRIPTION OF THE DRAWINGS

References are made to the accompanying drawings that form a part of this disclosure and which illustrate embodiments in which the systems and methods described in this specification can be practiced.

FIG. 1B illustrates a side view of a truck with a transport climate control system, according to one embodiment.

FIG. 1D illustrates a side view of a climate controlled transport unit with a multi-zone transport climate control system, according to one embodiment.

FIG. 1E illustrates a perspective view of a mass transit vehicle including a transport climate control system, according to one embodiment.

FIG. 3A is a schematic illustration of an interface system between an electrical supply equipment, an accessory PDU, a vehicle, and an electrically powered accessory configured to be used with at least one of a vehicle, a trailer, and a transport container, according to a first embodiment.

Like reference numbers represent like parts throughout.

DETAILED DESCRIPTIONS

Figure 1A:
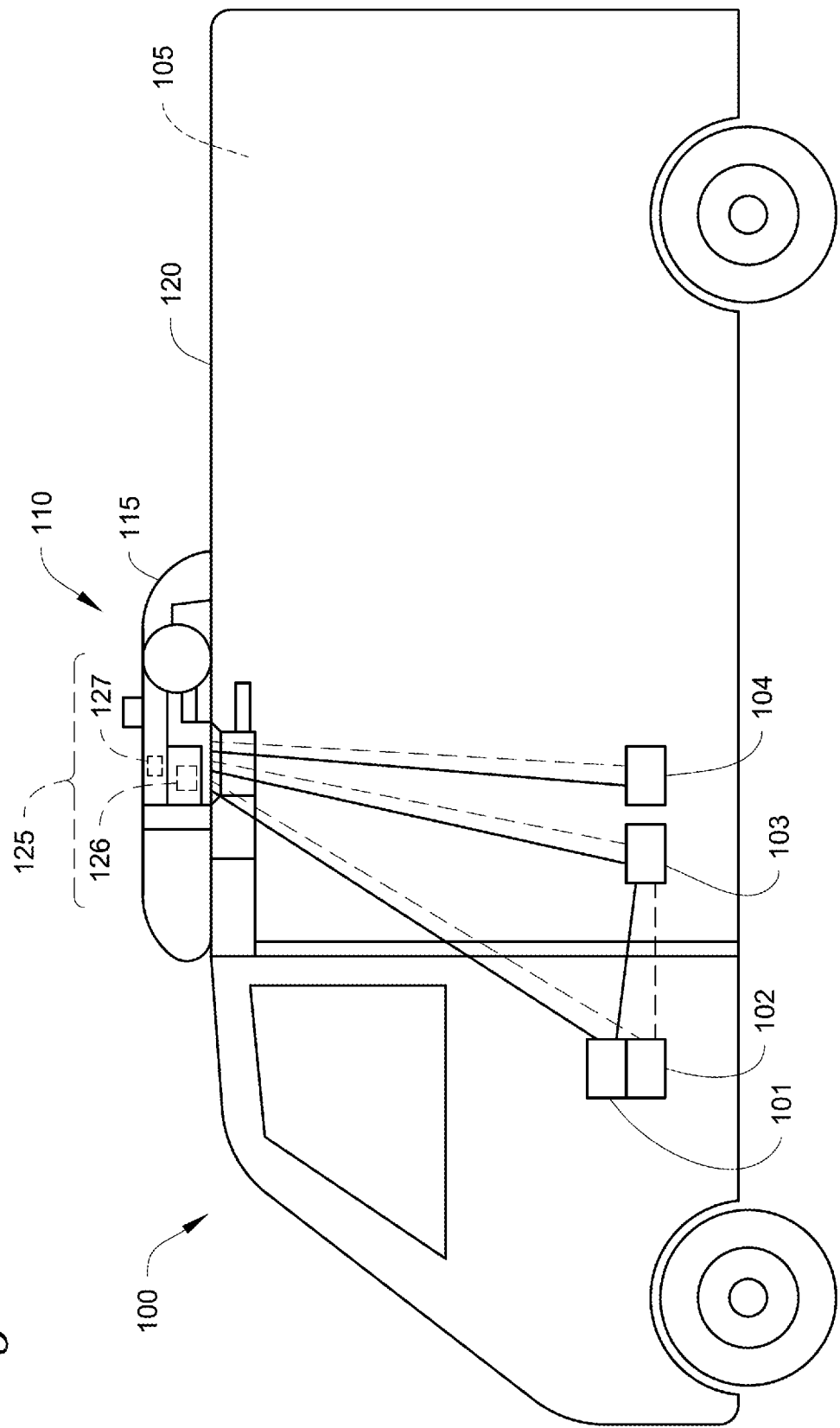
FIG. 1A illustrates a side view of a van with a transport climate control system, according to one embodiment.

This disclosure relates generally to an electrically powered accessory configured to be used with at least one of a vehicle, trailer, and a transport container. More specifically, the disclosure relates to a two-way interface system for connecting a vehicle and an electrically powered accessory that provides climate control within an internal space moved by the vehicle.

It is noted that: U.S. application Ser. No. 16/565,063, "SYSTEM AND METHOD FOR MANAGING POWER AND EFFICIENTLY SOURCING A VARIABLE VOLTAGE FOR A TRANSPORT CLIMATE CONTROL SYSTEM"; U.S. application Ser. No. 16/565,110, "TRANSPORT CLIMATE CONTROL SYSTEM WITH A SELF-CONFIGURING MATRIX POWER CONVERTER"; U.S. application Ser. No. 16/565,146, "OPTIMIZED POWER MANAGEMENT FOR A TRANSPORT CLIMATE CONTROL ENERGY SOURCE"; U.S. Provisional Application No. 62/897,833, "OPTIMIZED POWER DISTRIBUTION TO TRANSPORT CLIMATE CONTROL SYSTEMS AMONGST ONE OR MORE ELECTRIC SUPPLY EQUIPMENT STATIONS"; European Patent Application Number 19382776.3, "PRIORITIZED POWER DELIVERY FOR FACILITATING TRANSPORT CLIMATE CONTROL"; U.S. application Ser. No. 17/644,492, "TRANSPORT CLIMATE CONTROL SYSTEM WITH AN ACCESSORY POWER DISTRIBUTION UNIT FOR MANAGING TRANSPORT CLIMATE CONTROL ELECTRICALLY POWERED ACCESSORY LOADS"; U.S. application Ser. No. 16/565,252, "DEMAND-SIDE POWER DISTRIBUTION MANAGEMENT FOR A PLURALITY OF TRANSPORT CLIMATE CONTROL SYSTEMS"; and U.S. application Ser. No. 16/565,282, "OPTIMIZED POWER CORD FOR TRANSFERRING POWER TO A TRANSPORT CLIMATE CONTROL SYSTEM"; all filed concurrently herewith on Sep. 9, 2019, and the contents of which are incorporated herein by reference.

While the embodiments described below illustrate different embodiments of a transport climate control system, it will be appreciated that the electrically powered accessory is not limited to the transport climate control system or a climate control unit (CCU) of the transport climate control system. It will be appreciated that a CCU can be e.g., a transport refrigeration unit (TRU). In other embodiments, the electrically powered accessory can be, for example, a crane attached to a vehicle, a cement mixer attached to a truck, one or more food appliances of a food truck, a boom arm attached to a vehicle, a concrete pumping truck, a refuse truck, a fire truck (with a power driven ladder, pumps, lights, etc.), etc. It will be appreciated that the electrically powered accessory may require continuous operation even when the vehicle's ignition is turned off and/or the vehicle is parked and/or idling and/or charging. The electrically powered accessory can require substantial power to operate and/or continuous and/or autonomous operation (e.g., controlling temperature/humidity/airflow of a climate controlled space) on an as needed basis, independent of the vehicle's operational mode.

It will be appreciated that the electrically powered accessory may require continuous operation even when the vehicle's system enabling signal is turned off and/or the vehicle is in e.g., a park mode, a standby mode, and/or a charging mode. It will be appreciated that the system enabling signal is configured to enable the high voltage (HV) system of the VES. When the vehicle's system enabling signal is on, HV system of the VES is enabled. As defined herein, "low voltage" refers to Class A of the ISO 6469-3 in the automotive environment, in particular, a maximum working voltage of between 0V and 60V DC or between 0V and 30V AC. As defined herein, "high voltage" refers to Class B of the ISO 6469-3 in the automotive environment, in particular, a maximum working voltage of between 60V and 1500V DC or between 30V and 1000V AC. The electrically powered accessory can require substantial power to operate and/or continuous and/or autonomous operation (e.g., controlling temperature/humidity/airflow of a climate controlled space) on an as needed basis, independent of the vehicle's operational mode.

In many instances including during vehicle charging, the vehicle may limit/disable power output to an ePTO or to auxiliary applications. When an electrically powered accessory (e.g., a climate control unit requiring substantial power to operate) is associated with the vehicle, a load loss (e.g., produce, frozen foods, pharmaceuticals, etc. may not be safe or fresh) could occur due to lack of power for running/operating (e.g., keeping the required temperature, humidity, airflow, etc.) the electrically powered accessory. Embodiments disclosed herein can help to address e.g., load loss issues. For example, when an electric RV connects to an Electric Vehicle Supply Equipment (EVSE) at a campsite, embodiments disclosed herein can help to enable prioritizing the electrically powered accessory over the charging of the vehicle if the user so desires. Embodiments disclosed herein can help e.g., to enable electrically powered accessory use in e.g., a bus, when charging the bus, and can help to give priority for running HVAC, onboard power sockets for vacuums, lights, etc. when cleaning the bus.

FIG. 1A depicts a climate-controlled van 100 that includes a climate controlled space 105 for carrying cargo and a transport climate control system 110 for providing climate control within the climate controlled space 105. The transport climate control system 110 includes a climate control unit (CCU) 115 that is mounted to a rooftop 120 of the van 100. The transport climate control system 110 can include, amongst other components, a climate control circuit (not shown) that connects, for example, a compressor, a condenser, an evaporator and an expansion device to provide climate control within the climate controlled space 105. It will be appreciated that the embodiments described herein are not limited to climate-controlled vans, but can apply to any type of transport unit (e.g., a truck, a container (such as a container on a flat car, an intermodal container, a marine container, etc.), a box car, a semi-tractor, a bus, or other similar transport unit), etc.

The transport climate control system 110 also includes a programmable climate controller 125 and one or more sensors (not shown) that are configured to measure one or more parameters of the transport climate control system 110 (e.g., an ambient temperature outside of the van 100, an ambient humidity outside of the van 100, a compressor suction pressure, a compressor discharge pressure, a supply air temperature of air supplied by the CCU 115 into the climate controlled space 105, a return air temperature of air returned from the climate controlled space 105 back to the CCU 115, a humidity within the climate controlled space 105, etc.) and communicate parameter data to the climate controller 125. The climate controller 125 is configured to control operation of the transport climate control system 110 including the components of the climate control circuit. The climate controller unit 115 may comprise a single integrated control unit 126 or may comprise a distributed network of climate controller elements 126, 127. The number of distributed control elements in a given network can depend upon the particular application of the principles described herein.

Figure 2:
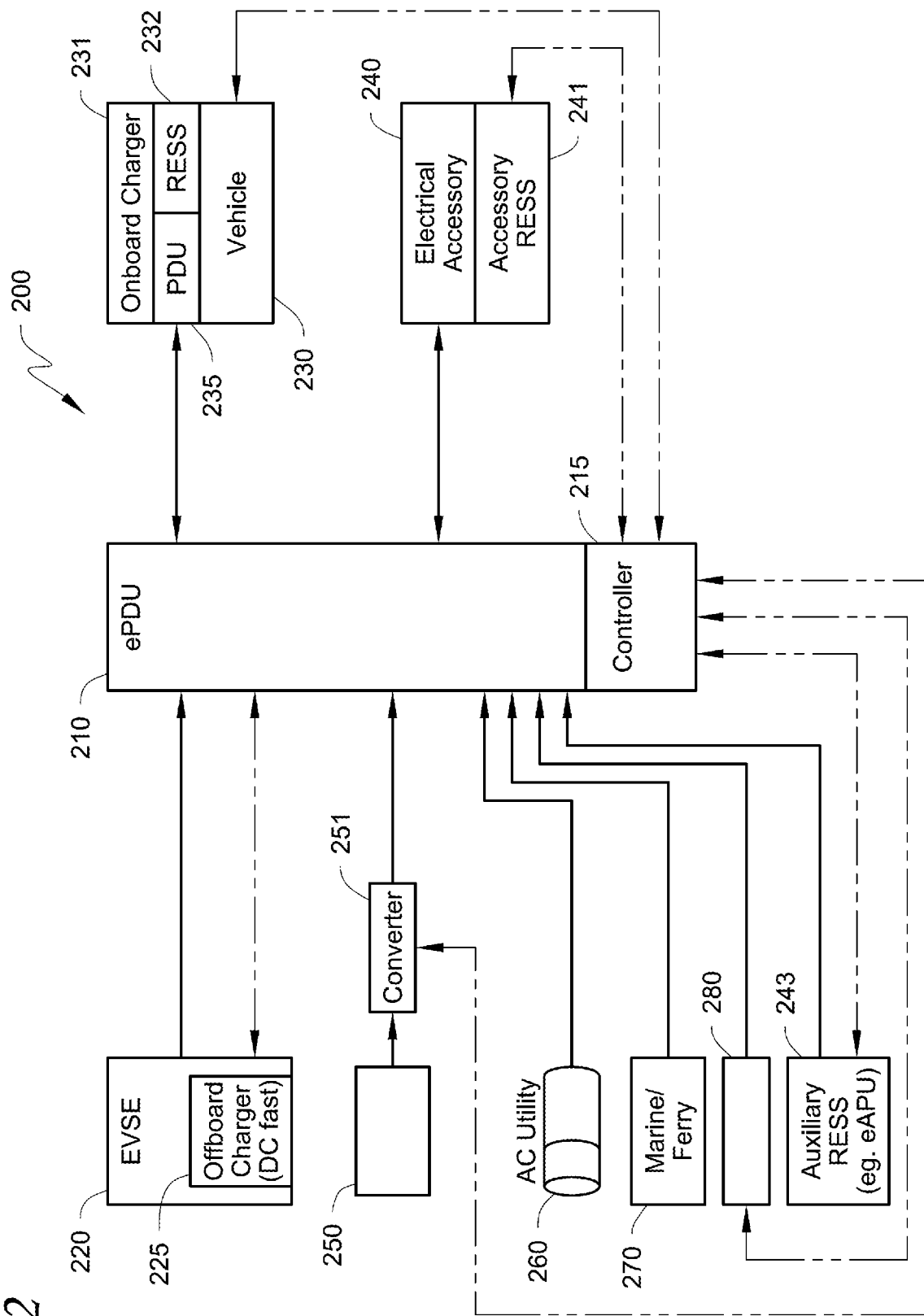
FIG. 2 is a schematic illustration of an interface system between an accessory power distribution unit (PDU), power sources, a vehicle and an electrically powered accessory configured to be used with at least one of a vehicle, trailer, and a transport container, according to one embodiment.
Figure 3B:
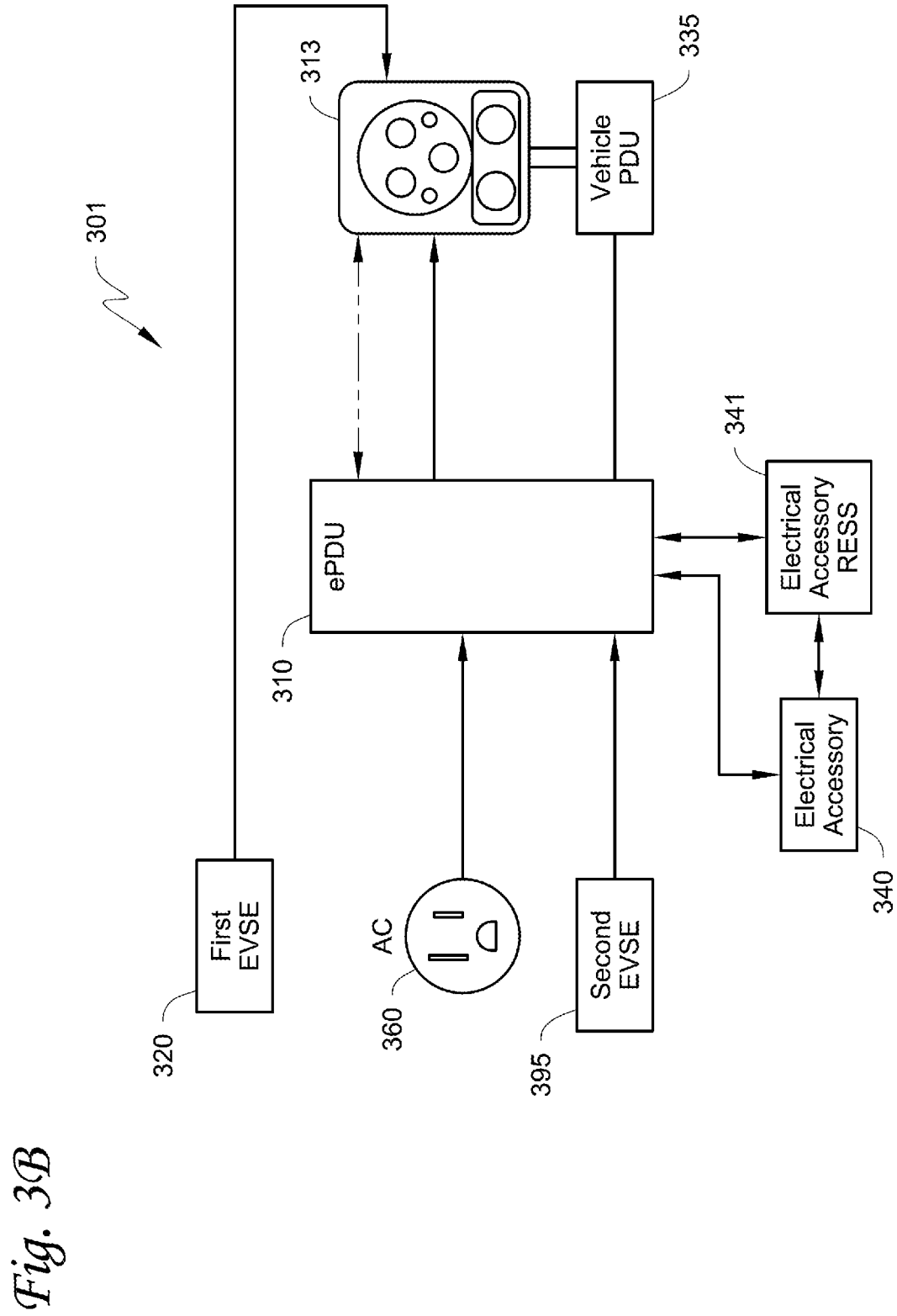
FIG. 3B is a schematic illustration of an interface system between an electrical supply equipment(s), an accessory PDU, a vehicle, and an electrically powered accessory configured to be used with at least one of a vehicle, a trailer, and a transport container, according to a second embodiment.

The climate-controlled van 100 can also include a vehicle PDU 101, a VES 102, a standard charging port 103, and/or an enhanced charging port 104 (see FIGS. 3A and 3B for the detailed description about the standard charging port and the enhanced charging port). The VES 102 can include a controller (not shown). The vehicle PDU 101 can include a controller (not shown). In one embodiment, the vehicle PDU controller can be a part of the VES controller or vice versa. In one embodiment, power can be distributed from e.g., an EVSE (not shown), via the standard charging port 103, to the vehicle PDU 101. Power can also be distributed from the vehicle PDU 101 to an electrical supply equipment (ESE, not shown) and/or to the CCU 115 (see solid lines for power lines and dotted lines for communication lines). In another embodiment, power can be distributed from e.g., an EVSE (not shown), via the enhanced charging port 104, to an ESE (not shown) and/or to the CCU 115. The ESE can then distribute power to the vehicle PDU 101 via the standard charging port 103. See FIGS. 2, 3A, and 3B for a more detailed discussion of the ESE.

FIG. 1B depicts a climate-controlled straight truck 130 that includes a climate controlled space 131 for carrying cargo and a transport climate control system 132. The transport climate control system 132 includes a CCU 133 that is mounted to a front wall 134 of the climate controlled space 131. The CCU 133 can include, amongst other components, a climate control circuit (not shown) that connects, for example, a compressor, a condenser, an evaporator and an expansion device to provide climate control within the climate controlled space 131.

The transport climate control system 132 also includes a programmable climate controller 135 and one or more sensors (not shown) that are configured to measure one or more parameters of the transport climate control system 132 (e.g., an ambient temperature outside of the truck 130, an ambient humidity outside of the truck 130, a compressor suction pressure, a compressor discharge pressure, a supply air temperature of air supplied by the CCU 133 into the climate controlled space 131, a return air temperature of air returned from the climate controlled space 131 back to the CCU 133, a humidity within the climate controlled space 131, etc.) and communicate parameter data to the climate controller 135. The climate controller 135 is configured to control operation of the transport climate control system 132 including components of the climate control circuit. The climate controller 135 may comprise a single integrated control unit 136 or may comprise a distributed network of climate controller elements 136, 137. The number of distributed control elements in a given network can depend upon the particular application of the principles described herein.

It will be appreciated that similar to the climate-controlled van 100 shown in FIG. 1A, the climate-controlled straight truck 130 of FIG. 1B can also include a vehicle PDU (such as the vehicle PDU 101 shown in FIG. 1A), a VES (such as the VES 102 shown in FIG. 1A), a standard charging port (such as the standard charging port 103 shown in FIG. 1A), and/or an enhanced charging port (e.g., the enhanced charging port 104 shown in FIG. 1A), communicating with and distribute power from/to the corresponding ESE and/or the CCU 133.

Figure 1C:
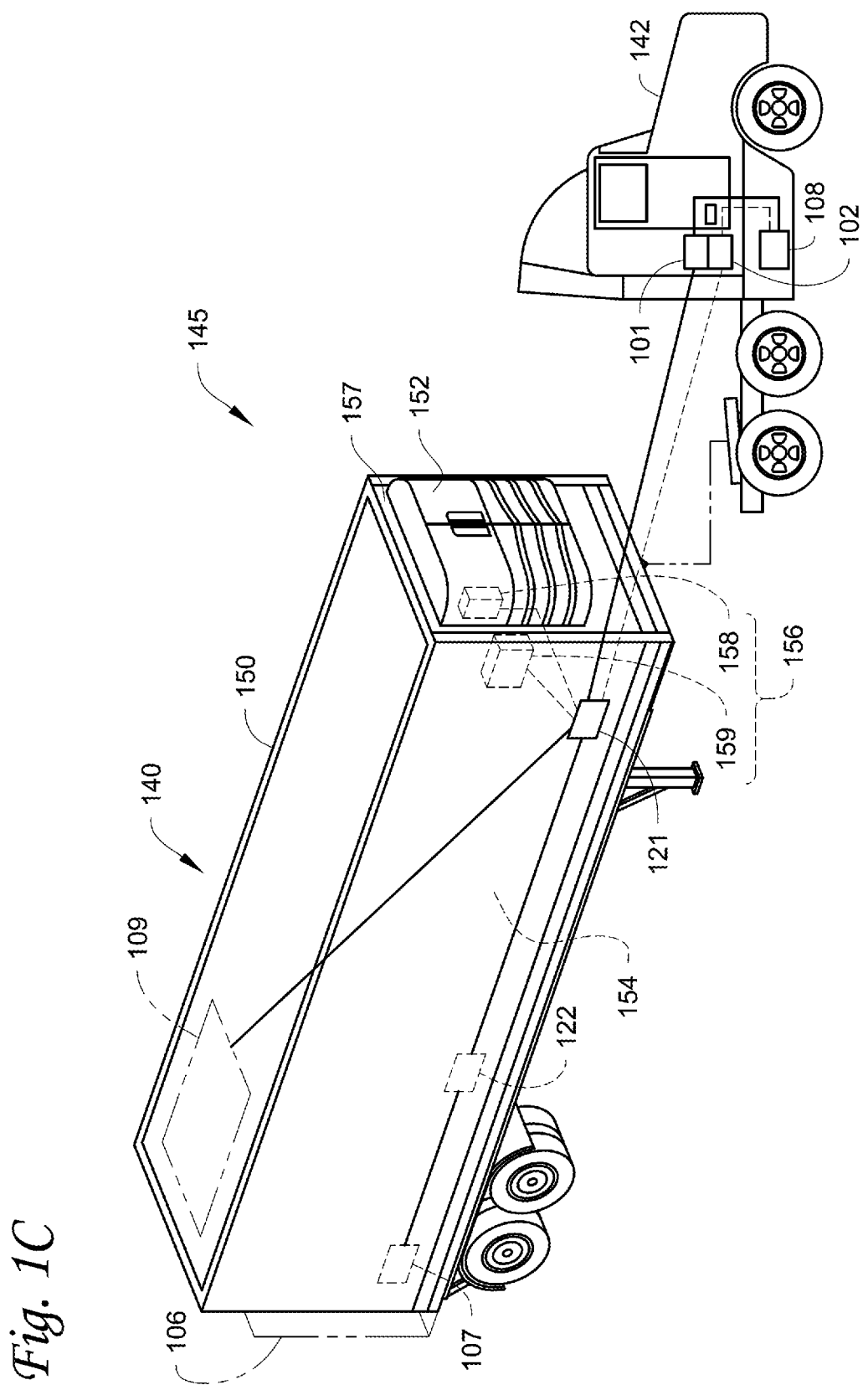
FIG. 1C illustrates a perspective view of a climate controlled transport unit, with a transport climate control system, attached to a tractor, according to one embodiment.

FIG. 1C illustrates one embodiment of a climate controlled transport unit 140 attached to a tractor 142. The climate controlled transport unit 140 includes a transport climate control system 145 for a transport unit 150. The tractor 142 is attached to and is configured to tow the transport unit 150. The transport unit 150 shown in FIG. 1C is a trailer.

The transport climate control system 145 includes a CCU 152 that provides environmental control (e.g. temperature, humidity, air quality, etc.) within a climate controlled space 154 of the transport unit 150. The CCU 152 is disposed on a front wall 157 of the transport unit 150. In other embodiments, it will be appreciated that the CCU 152 can be disposed, for example, on a rooftop or another wall of the transport unit 150. The CCU 152 includes a climate control circuit (not shown) that connects, for example, a compressor, a condenser, an evaporator and an expansion device to provide conditioned air within the climate controlled space 154.

The transport climate control system 145 also includes a programmable climate controller 156 and one or more sensors (not shown) that are configured to measure one or more parameters of the transport climate control system 145 (e.g., an ambient temperature outside of the transport unit 150, an ambient humidity outside of the transport unit 150, a compressor suction pressure, a compressor discharge pressure, a supply air temperature of air supplied by the CCU 152 into the climate controlled space 154, a return air temperature of air returned from the climate controlled space 154 back to the CCU 152, a humidity within the climate controlled space 154, etc.) and communicate parameter data to the climate controller 156. The climate controller 156 is configured to control operation of the transport climate control system 145 including components of the climate control circuit. The climate controller 156 may comprise a single integrated control unit 158 or may comprise a distributed network of climate controller elements 158, 159. The number of distributed control elements in a given network can depend upon the particular application of the principles described herein.

In some embodiments, the tractor 142 can include an optional APU 108. The optional APU 108 can be an electric auxiliary power unit (eAPU). Also, in some embodiments, the tractor 142 can also include a vehicle PDU 101 and a VES 102 (not shown). The APU 108 can provide power to the vehicle PDU 101 for distribution. It will be appreciated that for the connections, solid lines represent power lines and dotted lines represent communication lines. The climate controlled transport unit 140 can include a PDU 121 connecting to power sources (including, for example, an optional solar power source 109; an optional power source 122 such as Genset, fuel cell, undermount power unit, auxiliary battery pack, etc.; and/or an optional liftgate battery 107, etc.) of the climate controlled transport unit 140. The PDU 121 can include a PDU controller (not shown). The PDU controller can be a part of the climate controller 156. The PDU 121 can distribute power from the power sources of the climate controlled transport unit 140 to e.g., the transport climate control system 145. The climate controlled transport unit 140 can also include an optional liftgate 106. The optional liftgate battery 107 can provide power to open and/or close the liftgate 106.

It will be appreciated that similar to the climate-controlled van 100, the climate controlled transport unit 140 attached to the tractor 142 of FIG. 1C can also include a VES (such as the VES 102 shown in FIG. 1A), a standard charging port (such as the standard charging port 103 shown in FIG. 1A), and/or an enhanced charging port (such as the enhanced charging port 104 shown in FIG. 1A), communicating with and distribute power from/to a corresponding ESE and/or the CCU 152. It will be appreciated that the charging port(s) 103 and/or can be on either the tractor 142 or the trailer. For example, in one embodiment, the standard charging port 103 is on the tractor 142 and the enhanced charging port 104 is on the trailer.

FIG. 1D illustrates another embodiment of a climate controlled transport unit 160. The climate controlled transport unit 160 includes a multi-zone transport climate control system (MTCS) 162 for a transport unit 164 that can be towed, for example, by a tractor (not shown). It will be appreciated that the embodiments described herein are not limited to tractor and trailer units, but can apply to any type of transport unit (e.g., a truck, a container (such as a container on a flat car, an intermodal container, a marine container, etc.), a box car, a semi-tractor, a bus, or other similar transport unit), etc.

The MTCS 162 includes a CCU 166 and a plurality of remote units 168 that provide environmental control (e.g. temperature, humidity, air quality, etc.) within a climate controlled space 170 of the transport unit 164. The climate controlled space 170 can be divided into a plurality of zones 172. The term "zone" means a part of an area of the climate controlled space 170 separated by walls 174. The CCU 166 can operate as a host unit and provide climate control within a first zone 172a of the climate controlled space 166. The remote unit 168a can provide climate control within a second zone 172b of the climate controlled space 170. The remote unit 168b can provide climate control within a third zone 172c of the climate controlled space 170. Accordingly, the MTCS 162 can be used to separately and independently control environmental condition(s) within each of the multiple zones 172 of the climate controlled space 162.

The CCU 166 is disposed on a front wall 167 of the transport unit 160. In other embodiments, it will be appreciated that the CCU 166 can be disposed, for example, on a rooftop or another wall of the transport unit 160. The CCU 166 includes a climate control circuit (not shown) that connects, for example, a compressor, a condenser, an evaporator and an expansion device to provide conditioned air within the climate controlled space 170. The remote unit 168a is disposed on a ceiling 179 within the second zone 172b and the remote unit 168b is disposed on the ceiling 179 within the third zone 172c. Each of the remote units 168a,b include an evaporator (not shown) that connects to the rest of the climate control circuit provided in the CCU 166.

The MTCS 162 also includes a programmable climate controller 180 and one or more sensors (not shown) that are configured to measure one or more parameters of the MTCS 162 (e.g., an ambient temperature outside of the transport unit 164, an ambient humidity outside of the transport unit 164, a compressor suction pressure, a compressor discharge pressure, supply air temperatures of air supplied by the CCU 166 and the remote units 168 into each of the zones 172, return air temperatures of air returned from each of the zones 172 back to the respective CCU 166 or remote unit 168a or 168b, a humidity within each of the zones 118, etc.) and communicate parameter data to a climate controller 180. The climate controller 180 is configured to control operation of the MTCS 162 including components of the climate control circuit. The climate controller 180 may comprise a single integrated control unit 181 or may comprise a distributed network of climate controller elements 181, 182. The number of distributed control elements in a given network can depend upon the particular application of the principles described herein.

It will be appreciated that similar to the climate-controlled van 100, the climate controlled transport unit 160 of FIG. 1D can also include a vehicle PDU (such as the vehicle PDU 101 shown in FIG. 1A), a VES (such as the VES 102 shown in FIG. 1A), a standard charging port (such as the standard charging port 103 shown in FIG. 1A), and/or an enhanced charging port (e.g., the enhanced charging port 104 shown in FIG. 1A), communicating with and distribute power from/to the corresponding ESE and/or the CCU 166.

FIG. 1E is a perspective view of a vehicle 185 including a transport climate control system 187, according to one embodiment. The vehicle 185 is a mass-transit bus that can carry passenger(s) (not shown) to one or more destinations. In other embodiments, the vehicle 185 can be a school bus, railway vehicle, subway car, or other commercial vehicle that carries passengers. The vehicle 185 includes a climate controlled space (e.g., passenger compartment) 189 supported that can accommodate a plurality of passengers. The vehicle 185 includes doors 190 that are positioned on a side of the vehicle 185. In the embodiment shown in FIG. 1E, a first door 190 is located adjacent to a forward end of the vehicle 185, and a second door 190 is positioned towards a rearward end of the vehicle 185. Each door 190 is movable between an open position and a closed position to selectively allow access to the climate controlled space 189. The transport climate control system 187 includes a CCU 192 attached to a roof 194 of the vehicle 185.

The CCU 192 includes a climate control circuit (not shown) that connects, for example, a compressor, a condenser, an evaporator and an expansion device to provide conditioned air within the climate controlled space 189. The transport climate control system 187 also includes a programmable climate controller 195 and one or more sensors (not shown) that are configured to measure one or more parameters of the transport climate control system 187 (e.g., an ambient temperature outside of the vehicle 185, a space temperature within the climate controlled space 189, an ambient humidity outside of the vehicle 185, a space humidity within the climate controlled space 189, etc.) and communicate parameter data to the climate controller 195. The climate controller 195 is configured to control operation of the transport climate control system 187 including components of the climate control circuit. The climate controller 195 may comprise a single integrated control unit 196 or may comprise a distributed network of climate controller elements 196, 197. The number of distributed control elements in a given network can depend upon the particular application of the principles described herein.

It will be appreciated that similar to the climate-controlled van 100, the vehicle 185 including a transport climate control system 187 of FIG. 1E can also include a vehicle PDU (such as the vehicle PDU 101 shown in FIG. 1A), a VES (such as the VES 102 shown in FIG. 1A), a standard charging port (such as the standard charging port 103 shown in FIG. 1A), and/or an enhanced charging port (e.g., the enhanced charging port 104 shown in FIG. 1A), communicating with and distribute power from/to the corresponding ESE and/or the CCU 192.

FIG. 2 is a schematic illustration of an interface system 200 between an accessory power distribution unit (PDU), power sources, a vehicle and an electrically powered accessory configured to be used with at least one of a vehicle, trailer, and a transport container, according to one embodiment. It will be appreciated that in one embodiment, the power sources described in FIG. 2 can be connected to and/or communicated with the electrically powered accessory without the accessory PDU. It will be appreciated that a PDU can be a component (e.g., a relay and/or a contactor, etc.) that can be configured to control and/or distribute power flow.

The interface system 200 includes an accessory PDU 210. The accessory PDU 210 includes a controller 215. The accessory PDU 210 can connect to and/or communicate with an electrical supply equipment (ESE) 220. The ESE 220 can be an EVSE, an EV charging station, a vehicle charger system, etc. The accessory PDU 210 can also connect to and/or communicate with a vehicle 230 and/or an electrically powered accessory 240 configured to be used with at least one of the vehicle 230, a trailer, and a transport container. The accessory PDU 210 can enable fault monitoring and system protection, which can be used for protecting the interface system 200 and can enable analytics and features which allow for the electrically powered accessory 240 use to not void a manufacturer warranty of the vehicle 230.

It will be appreciated that the accessory PDU 210 can control the ESE 220 (or other power sources such as the utility power, etc.) to distribute electrical power received from the ESE 220 (or other power sources such as the utility power, etc.) to a vehicle 230 through a standard charging port, to the electrically powered accessory 240, and/or to the accessory RESS (Rechargeable Energy Storage System) 241. The accessory PDU 210 can also control power sources (including power from ePTO, utility power, a second ESE, etc.) to distribute electrical power received from the power sources to the electrically powered accessory 240, and/or to the accessory RESS 241.

The ESE 220 includes an off-board charger 225. The off-board charger 225 can be a direct current (DC) charger for fast charging.

The vehicle 230 includes a vehicle electrical system having an on-board charger 231 and a RESS 232. See, for example, U.S. Pat. No. 8,441,228 (which is incorporated by reference in its entirety) for a description of a vehicle electrical system. The vehicle electrical system can provide electrical power to the electrical loads of the vehicle, and/or to charge or discharge the energy storage of the vehicle. The vehicle 230 can be, for example, the climate-controlled van 100, the climate-controlled straight truck 130, the tractor 142 with a climate controlled transport unit 140 attached to, the climate controlled transport unit 160, and/or the vehicle 185 of FIGS. 1A-1E and/or a recreational vehicle (RV). The vehicle electrical system also includes a power distribution unit (PDU) 235. The PDU 235 can include a controller (not shown) configured to distribute electric power of the vehicle electrical system to loads of the vehicle electrical system.

Electrical loads (to be powered) of the interface system 200 can include low voltage (LV) DC loads such as solenoids, fans, compressor motors, controllers, battery chargers, etc. Electrical loads (to be powered) of the interface system 200 can also include high voltage (HV) DC loads such as fan motor, compressor motor, battery chargers, batteries, etc. Electrical loads (to be powered) of the interface system 200 can further include HV AC loads such as fan motor, compressor motor, battery chargers, On-Board Charger (OBC, which can be used as an accessory inverter such as a bi-directional inverter, etc.), AC Power Module (ACPM), etc. Also Electrical loads (to be powered) of the interface system 200 can include motors having power converters which can include DC/DC converters and/or motor control inverters. ACPM can be a power converter used to take input of single-phase or three-phase AC power and create a DC power to feed the DC link. The ACPM can be contained within the electrically powered accessory 240 or the accessory PDU 210. ACPM can also be a vehicle OBC for charging the vehicle RESS 232.

The electrically powered accessory 240 can include an accessory RESS 241. The electrically powered accessory 240 can be, for example, the transport climate control system 110, 132, 145, 162, and/or 187 of FIGS. 1A-1E. The accessory RESS 241 can provide power to operate the electrically powered accessory 240. The electrically powered accessory 240 can include HV and/or LV loads including AC (single-phase and/or three-phase) and/or DC loads. In one embodiment, AC power from the ESE 220 can be converted to DC voltage via the accessory PDU 210, and then converted to AC voltage via the accessory PDU 210 to supply power to e.g., a three-phase AC driven CCU.

The accessory PDU 210 can also connect to and/or communicate with a power source 250, a utility power source 260, a marine and/or ferry power source 270, a power source 280, and/or an auxiliary RESS 243. The power source 250 can be a solar power source, an auxiliary energy source (e.g., battery pack), an electric APU auxiliary energy storage, a fuel cell power source, and/or a liftgate energy storage, etc. The power source 250 can connect to a converter 251, which in turn can connect to the accessory PDU 210. It will be appreciated that the converter 251 can be a part of the accessory PDU 210. The converter 251 can be a bidirectional power converter. In some embodiments, the converter 251 can be a DC to DC boost or buck converter. In some embodiments, the converter 251 can also be a DC to AC inverter. The utility power source 260 can provide single-phase alternating current (AC) and/or three-phase AC power. The marine and/or ferry power source 270 can, for e.g., convert energy carried by ocean waves, tides, salinity, and/or ocean temperature differences to generate electrical power. The power source 280 can be a generator set (Genset) power source. The power source 280 can also be a CCU power source engine (e.g., engine with electric generator and/or inverter and/or converter). The power source 280 can further be a micro-turbine with generator to provide electrical power. The power source 280 can be a combination of e.g., an electrical generator and an engine mounted together to form a single piece of equipment that produces electrical power. In one embodiment, the auxiliary RESS 243 can be an electric auxiliary power unit (eAPU). The electrical power supplied from the marine and/or ferry power source 270, the power source 280, and/or the auxiliary RESS 243 can be AC and/or DC power. The power source 280 can connect to an AC to DC converter (not shown) before connecting to the accessory PDU 210. The AC to DC converter can be a rectifier. In one embodiment, the AC to DC converter can be an ACPM active rectifier, with boost power factor correction/controller (PFC). In one embodiment, the AC to DC converter can be bidirectional.

FIG. 2 shows power lines (solid lines) between/among the components and communication lines (dotted lines) between controller 215 and the components (e.g., controllers of the components). It will be appreciated that the communication(s) between/among the components of FIG. 2 can be accomplished wirelessly or through wire connection(s), through any suitable communication media and/or using any suitable communication protocol(s).

It will be appreciated that energy can be a finite resource, especially the energy available in the RESS. Even an ESE (such as an EVSE) has a limited power and/or limited time/duration to provide power. In one embodiment, optimizing the power in the system (e.g., optimizing discharging or charging, optimizing operations of various components) can be implemented to manage the usage of the finite energy source(s).

It will also be appreciated that available energy (e.g., for the TCCS and/or VES) can be forecasted/predicted/estimated, even when the TCCS/VES is connected to ESE. For example, the ESE supply has a limited power given by the ESE equipment, and the charging duration can be forecasted based on the anticipated charging time. The anticipated charging time can be based on e.g., route data or determined by the user (e.g., driver, operator) by specifying a predetermined time/duration for charging. Available energy (e.g., for the TCCS and/or VES) from the ESE can be based on how much supply power from the ESE over time. Charging can help in the optimization of energy since energy is added to the system. In some embodiments, the accessory can dominate over vehicle charging (e.g., ESE provides power to the accessory, which has a higher priority level than charging the vehicle). In other embodiments, the priority level for the power to be supplied to the accessory can be decreased to allow the vehicle to charge better.

In operation, the ESE 220 can be configured to supply electrical power (or energy) for powering and/or charging the vehicle 230 (e.g., the vehicle electrical system of the vehicle 230) and/or the electrically powered accessory 240, e.g. through the accessory PDU 210, via connectors (e.g., charging port, not shown). The electric power supplied from the ESE 220 (and/or other power sources) can include alternating current (AC) and/or direct current (DC) power. The AC power can be single-phase AC or three phase AC power. The DC power can be Low Voltage (LV) DC power (e.g., Class A) and/or High Voltage (HV) DC power (e.g., Class B). The connectors can be any suitable connectors that support e.g., Combined Charging System (CCS, guided by e.g., CharIN), CHAdeMO, Guobiao recommended-standard 20234, Tesla Supercharger, and/or other EVSE standards. Typically the AC power and the DC power for fast charging from the ESE 220 work exclusively. Embodiments disclosed herein can enable supplying both the AC power and the DC power for fast charging from the ESE 220, via e.g., the accessory PDU 210, to e.g., supply power to the vehicle 230 and/or charge the vehicle RESS 232 with the DC power and to operate the electrically powered accessory 240 with AC power.

It will be appreciated that the controller 215 of the accessory PDU 210 can be a part of the controller of the electrical accessory 240. The controller 215 can communicate with the vehicle 230, the vehicle RESS 232, the OBC 231, the accessory RESS 241, the auxiliary RESS 243, intelligent power sources 280 such as a Genset, and/or the converter 251.

The controller 215 is configured to manage power inputs from e.g., the ESE 220 and/or other power sources such as a utility power source, etc., and to prioritize and control power flows to the vehicle 230 and/or the electrically powered accessory 240, etc.

The controller 215 can communicate with the ESE 220 using e.g., powerline communications, Pulse Width Modulation (PWM) communications, Local Interconnect Network (LIN) communications, Controller Area Network (CAN) communications, and/or Pilot signal analog feedback, etc. to support e.g., CCS, CHAdeMO, Guobiao recommended-standard 20234, Tesla Supercharger, and/or other EVSE standards.

The communications between the controller 215 and the ESE 220 include e.g., a Control Pilot (CP) line and a Proximity Pilot (PP) line. The PP line is also known as Plug Present for determining status and capability of the charging port. The CP line can be used e.g., by the controller 215 to indicate e.g., the charging level(s) of e.g., the vehicle 230 and/or the electrically powered accessory 240, to initiate charging, and/or to communicate other information to the ESE 220. The ESE 220 can use the CP line to detect e.g., the presence of the vehicle 230 and/or the electrically powered accessory 240 e.g. via the accessory PDU 210, to communicate e.g., the maximum and/or minimum allowable charging current and/or voltage to the controller 215, and/or to control e.g., the charging current and/or voltage, and/or to control the beginning and/or ending of charging. For example, in SAE J1772 (a North American standard for electrical connectors for electric vehicles maintained by the SAE International), the PWM duty cycle can set the current limit for power delivery. The PP line can be used to prevent movement of the vehicle 230 and/or the electrically powered accessory 240 and to indicate e.g., the latch release button to the vehicle 230 and/or the electrically powered accessory 240, e.g. via the accessory PDU 210. It will be appreciated that there can be a connector release switch connected in the PP circuit, and pressing on the connector release switch can modify the PP signal value to indicate the charging port being disconnected from the controllers on the PP line.

In one embodiment, the interface system 200 can include a user interface device (not shown). The user interface device can be a mobile device (e.g., phone, computer, etc.) or a server. The user interface device can connect to and/or communicate with the ESE 220 and the accessory PDU 210. It will be appreciated that the communications from the ESE 220 to the accessory PDU 210 can be sent to the user interface device. A user can review the information from the ESE 220 and send request(s) and/or confirmation(s) to the ESE 220 and/or the controller 215, to make adjustment(s) and/or request(s) accordingly, via the user interface device. The user interface device can be used to view charging rate (of the electric power), perform payment authorization, etc., and/or can track how much electrical power goes to the vehicle 230 and/or to the electrically powered accessory 240, and/or split payment billing, etc.

The controller 215 can communicate with a controller (not shown, e.g., the controller 125, 135, 156, 180, and/or 195 of FIGS. 1A-1E) of the electrically powered accessory 240. In one embodiment, the controller 215 can be integrated with the controller (e.g., the controller 125, 135, 156, 180, and/or 195 of FIGS. 1A-1E) of the electrically powered accessory 240. In one embodiment, the electrically powered accessory 240 can include sensors (e.g., temperature, pressure, voltage, current, battery status, and/or battery charging level sensor, etc.). The electrically powered accessory 240 can communicate the status (e.g., status of the sensors and/or charge status) to the controller 215. In another embodiment, the controller 215 can include sensors (e.g., temperature, pressure, voltage, current, battery status, and/or battery charging level sensor, etc.). The controller 215 can communicate and request the status (e.g., status of the sensors and/or charge status) to the electrically powered accessory 240. If the electrically powered accessory 240 indicates that electric power is needed to power and/or to charge the electrically powered accessory 240 (e.g., the accessory RESS 241), the controller 215 can e.g., control the accessory PDU 210 to distribute power (AC and/or DC) received from the ESE 220 (and/or other power sources) to the electrically powered accessory 240.

The controller 215 can communicate with a PDU 235 of the vehicle 230. The PDU 235 can include a controller (not shown). In one embodiment, the vehicle 230 can include sensors (e.g., temperature, location, pressure, voltage, current, battery status, and/or battery charging level sensor, etc.). The sensors can sense e.g., an ambient temperature, a temperature of a user's (e.g., a driver's) space/seat, a temperature of the vehicle RESS 232, a location of the vehicle, an ambient pressure, voltage/current of a VES circuit, a charging level of the vehicle RESS, etc. The vehicle 230 can communicate the status (e.g., status of the sensors and/or charge status) to the controller 215. In another embodiment, the controller 215 can include sensors (e.g., temperature, location, pressure, voltage, current, battery status, and/or battery charging level sensor, etc.). The sensors can sense e.g., an ambient temperature, a temperature of a climate controlled space of the electrically powered accessory, a temperature of the accessory RESS, a location of the electrically powered accessory, an ambient pressure, discharge/suction pressure of a compressor of the electrically powered accessory, voltage/current of an electrically powered accessory circuit, a charging level of the accessory RESS, etc. The controller 215 can communicate the status (e.g., status of the sensors and/or charge status) to the vehicle 230. It will be appreciated that the controller 215 can communicate messages to the vehicle 230 for the vehicle 230 to operate in a proper system operational mode. The status can be modified. For example, when the vehicle 230 is fully charged and ready to drive, but the controller 215 determines that the electrical accessory 240 still requires attention, the controller 215 can prevent the vehicle 230 from disconnecting and driving away. If the vehicle 230 indicates that electric power is needed to charge the vehicle 230, the controller 215 can control the accessory PDU 210 to distribute power (AC and/or DC) received from the ESE 220 (and/or other power sources) to the vehicle 230 to provide power to the on-board charger 231 and/or to charge the RESS 232.

The controller 215 can communicate the information received from the ESE 220 (and/or other power sources) to the vehicle 230 (e.g., the PDU 235). The vehicle 230 can initiate/request charging from the ESE 220, e.g., via the controller 215 and the CP line.

The controller 215 can obtain sensed data (via the sensors) for the power inputs, monitor power usage, and communicate with all energy sources to balance power (e.g., to balance charging level between vehicle RESS and accessory RESS, etc.). The controller 215 can have telematics capability. Data can be shared over telematics to coordinate and perform data analytics on the power usage of the systems (and/or enable a priority mode to supply power to power demands with a higher priority level). In some embodiments, the controller 215 can drive the door interlock (to prevent the vehicle and/or the electrically powered accessory from moving, for example, when the door is open), status lights for charging, and/or the lock on the connector.

It will be appreciated that power demand/request from the electrically powered accessory 240 (e.g., for powering the transport climate control system to keep the cargo (e.g., produce, frozen foods, pharmaceuticals, etc.) safe and/or fresh) can have a higher priority level (e.g., the cargo is regulated by government bodies or of high economic value) than power demand/request from the vehicle 230 (e.g., for charging the vehicle 230). See FIG. 5 for examples of different priority levels. It will be appreciated that the electrical accessory can obtain energy from a source such as the vehicle and/or the accessory auxiliary RESS. As such, the controller 215 can control the accessory PDU 210 to distribute power (AC and/or DC) received from the ESE 220 (and/or other power sources) to the electrically powered accessory 240 first, and then to the vehicle 230 if the higher priority power demand from the electrically powered accessory 240 is satisfied. It will be appreciated that satisfying the higher priority power demand (e.g., for high value cargo) from the electrically powered accessory 240 may cause the vehicle to be operate in a "reduced operation mode" (e.g., a "limp home" mode where the vehicle is commanded to reduce maximum speed) when e.g., the total energy available is not sufficient to satisfy both the higher priority power demand from the electrically powered accessory 240 and the power demand from the vehicle (e.g., for driving at a full/maximum speed). It will be appreciated that lowering/reducing the amount of power over time (e.g., in the "reduced operation mode") can help to optimize the usage of the finite energy source. In some embodiments, power demand/request from the vehicle 230 can have a higher priority level than power demand/request from the power demand/request from the electrically powered accessory 240. As such, the controller 215 can control the accessory PDU 210 to distribute power (AC and/or DC) received from the ESE 220 (and/or other power sources) to the vehicle 230 first, and then to the electrically powered accessory 240 if the higher priority power demand from the vehicle 230 is satisfied.

It will also be appreciated that the controller 215 can control the accessory PDU 210 to distribute power (AC and/or DC) received from the ESE 220 (and/or other power sources) to the vehicle 230 and to the electrically powered accessory 240 simultaneously (e.g., AC power (or one power input) to the electrically powered accessory 240 and DC power (or another power input) to the vehicle 230, or vice versa, if one type of power (AC or DC) and/or one power input (e.g., ESE, utility power, etc.) is sufficient to satisfy the higher priority power demand). It will further be appreciated that the priority level of the power demand can be predetermined or determined by a user and communicated to the controller 215. Also it will be appreciated that the priority level can be overridden by e.g., feedback from a human machine interface (HMI) to force certain operational modes.

The controller 215 can communicate with the converter 251 to exchange operational information regarding e.g., power performance, for example, voltages and/or currents and/or operational levels such as the speed setpoint of the compressor converter drive.

The controller 215 can communicate with the power source 280 (e.g., Genset) to communicate power performance and operation, for example, the maximum power capability of the Genset (which can change depending on operational area, such as operational speed limitations in particular areas) and/or power supplied including voltage, current, and/or frequency. The controller 215 can command the Genset on and the power level the Genset can operate at.

The controller 215 can communicate with the Auxiliary RESS 243 to communicate power capability (e.g., available voltage and/or current), state/status of charge, and/or priority level of charging the Auxiliary RESS 243. It will be appreciated that the state/status of charge of the Auxiliary RESS 243 can be used by the controller 215 to prevent overcharge (e.g., to run TRU if needed since overcharging can cause damages, and if necessary the Auxiliary RESS 243 can be used to cross charge the vehicle to prevent possible battery damages) and/or prevent undercharge of the Auxiliary RESS 243.

It will be appreciated that the communication can be conducted via e.g., powerline communications, Pulse Width Modulation (PWM) communications, Local Interconnect Network (LIN) communications, Controller Area Network (CAN) communications, and/or any other suitable communications.

FIG. 3A is a schematic illustration of an interface system 300 between an electrical supply equipment, an accessory PDU 310, a vehicle, and an electrically powered accessory 340 configured to be used with at least one of a vehicle, a trailer, and a transport container, according to a first embodiment. FIG. 3B is a schematic illustration of an interface system 301 between electrical supply equipment(s) 320, 395, an accessory PDU 310, a vehicle, and an electrically powered accessory 340 configured to be used with at least one of a vehicle, a trailer, and a transport container, according to a second embodiment.

It will be appreciated that in one embodiment, the interface systems 300 and 301 can be between the vehicle and the electrical accessory without the accessory PDU.

As shown in FIG. 3A, the accessory PDU 310 can connect to and/or communicate with an ESE (not shown), through an enhanced charging port 311. The enhanced charging port 311 can be any suitable charging port in compliance with one or more of the CCS, CHAdeMO, Guobiao recommended-standard 20234, Tesla Supercharger, and/or other EVSE standards, with portions or all of the communication/control pins and/or AC and/or DC power supply pins (from one of more of the different EVSE standards) populated/enabled. The accessory PDU 310 can be e.g., the accessory PDU 210 of FIG. 2. The ESE can be the ESE 220 of FIG. 2. The accessory PDU 310 can connect to and/or communicate with an AC power source 312. The AC power source 312 can be the power source 250, the utility power source 260, the marine and/or ferry power source 270, the power source 280, and/or the auxiliary RESS 243 of FIG. 2 or any other suitable power source.

The accessory PDU 310 can control the ESE to distribute electrical power received from the ESE to a vehicle (not shown, e.g., the vehicle 230 of FIG. 2) through a standard charging port 313, to the electrically powered accessory 340, and/or to the accessory RESS 341. The standard charging port 313 can be any suitable charging port in compliance with CCS, CHAdeMO, Guobiao recommended-standard 20234, Tesla Supercharger, and/or other EVSE standards. The electrically powered accessory 340 can be the electrically powered accessory 240 of FIG. 2. The accessory RESS 341 can be the accessory RESS 241 of FIG. 2. The accessory PDU 310 can also control the AC power source 312 to distribute electrical power received from the AC power source 312 to the vehicle through the standard charging port 313, to the electrically powered accessory 340, and/or to the accessory RESS 341.

The accessory RESS 341 can be controlled (e.g., by the controller of the accessory PDU 310) to supply electrical power to the electrically powered accessory 340.

The ESE can be configured to lock and monitor (e.g., prevent movement of) the vehicle and/or the electrically powered accessory 340 via the accessory PDU 310 through e.g., the PP line of the enhanced charging port 311.

The accessory PDU 310 can monitor the maximum and/or minimum allowable charging current and/or voltage from the ESE and/or the AC power source 312, to distribute power from the ESE and/or the AC power source 312 to the vehicle, the electrically powered accessory 340, and/or the accessory RESS 341, based on the priority level of the power demand/request from the vehicle (and/or from a user), the electrically powered accessory 340, and/or the accessory RESS 341. For example, the accessory PDU 310 can include a parameter that sets the maximum allowable charging current. The electrically powered accessory 340 (when having a higher priority power demand) can obtain power supply from e.g., the accessory PDU 310 when the vehicle is using power sources for operation (e.g., charging, driving, etc.). In the embodiment of FIG. 3A, the controller of the accessory PDU 310 can be the main/master controller (for the ESE 320) of the interface system 300.

In FIG. 3A, it is the accessory PDU 310 that controls the ESE to distribute power to the vehicle and/or to the electrically powered accessory 340, based on e.g., a priority level of the power demand from the vehicle and/or a priority level of the power demand from the electrically powered accessory 340. In FIG. 3B, it is the vehicle (e.g., PDU of the vehicle) that controls the ESE to charge the vehicle and/or to distribute power to the electrically powered accessory via e.g., ePTO. In FIG. 3B, the vehicle (not shown, e.g., the vehicle 230 of FIG. 2) can connect to and/or communicate with the ESE 320, through the standard charging port 313, via the vehicle PDU 335. In some embodiments, the ESE 320 can be the ESE 220 of FIG. 2. In some embodiments, the vehicle PDU 335 can be the vehicle PDU 235 of FIG. 2.

In the embodiment of FIG. 3B, the ESE 320 can be configured to supply electrical power (or energy) for charging the vehicle (e.g., a vehicle electrical system of the vehicle) via the standard charging port 313. The electric power supplied from the ESE 320 can include alternating current (AC) and/or direct current (DC) power. The AC power can be single-phase AC or three phase AC power. The DC power can be Low Voltage (LV) DC power (e.g., Class A) and/or High Voltage (HV) DC power (e.g., Class B).

The PDU 335 can communicate with the ESE 320 using e.g., powerline communications, Pulse Width Modulation (PWM) communications, Local Interconnect Network (LIN) communications, Controller Area Network (CAN) communications, and/or Pilot signal analog feedback, etc. to support e.g., CCS, CHAdeMO, Guobiao recommended-standard 20234, Tesla Supercharger, and/or other EVSE standards.

The communications between the PDU 335 and the ESE 320 include e.g., a CP line and a PP line. The CP line can be used e.g., by the PDU 335 to indicate e.g., the charging level(s) of e.g., the vehicle, to initiate charging, and/or to communicate other information to the ESE 320. The ESE 320 can use the CP line to detect e.g., the presence of the vehicle, to communicate e.g., the maximum and/or minimum allowable charging current and/or voltage to the PDU 335, and/or to control e.g., the charging current and/or voltage, and/or to control the beginning and/or ending of charging. The PP line can be used (e.g., between the ESE 320 and a vehicle controller) to prevent movement of the vehicle and to indicate e.g., the latch release button to the vehicle.

The vehicle PDU 335 can communicate with a controller (not shown, e.g., the controller 215 of FIG. 2) of the accessory PDU 310. The controller of the accessory PDU 310 can determine the status (e.g., status of the sensors (e.g., temperature, location, pressure, voltage, current, battery status, and/or battery charging level sensor, etc.) and/or charge status) of the electrically powered accessory 340 and/or the accessory RESS 341. The sensors can sense e.g., an ambient temperature outside the vehicle, a temperature of a climate controlled space of the electrically powered accessory, a temperature of the accessory RESS, a location of the electrically powered accessory, an ambient pressure outside the vehicle, discharge/suction pressure of a compressor of the electrically powered accessory, voltage/current of an electrically powered accessory circuit, a charging level of the accessory RESS, etc.

In some embodiments, it will be appreciated that power demand/request from the electrically powered accessory 340 and/or the accessory RESS 341 (e.g., for powering the transport climate control system to keep the cargo (e.g., produce, frozen foods, pharmaceuticals, etc.) safe and/or fresh) can have a higher priority level than the power demand/request from the vehicle (e.g., for charging the vehicle). As such, controller of the accessory PDU 310 can request an electric power take-off (ePTO) to be enabled by the vehicle PDU 335, based on the priority level of the power demand/request from the electrically powered accessory 340 and/or the accessory RESS 341 (e.g., when such priority level is higher than the priority level of the power demand from the vehicle). ePTO can be defined as e.g., taking electrical power from a power source and transmitting the electrical power to an application such as an attached implement or separate machines, via electric mechanisms. In other embodiments, the electrically powered accessory 340 and/or the accessory RESS 341 can have a lower priority level than the power demand/request from the vehicle (e.g., for charging the vehicle). In yet some other embodiments, the priority level between the electrically powered accessory 340 and/or the accessory RESS 341 at one end and the power demand/request from the vehicle at the other end can vary based on a variety of factors including, for example, cargo being stored.

In the embodiment of FIG. 3B, the controller of the PDU 335 can be the main/master controller (for the ESE 320) of the interface system 301. If ePTO is enabled, when for e.g., the vehicle is charging by the ESE 320 via the standard charging port 313, the power (a portion or all) from the ESE 320 can be taken and transmitted to the electrically powered accessory 340 and/or the accessory RESS 341, via the accessory PDU 310. The ePTO can be disabled by the PDU 335 if there is no power demand/request from the electrically powered accessory 340 and/or the accessory RESS 341, and/or the priority level of the power demand/request from the electrically powered accessory 340 and/or the accessory RESS 341 is not higher than the priority level of the power demand from the vehicle.

The accessory PDU 310 can connect to and/or communicate with an AC power source 360. The AC power source 360 can be the power source 250, the utility power source 260, the marine and/or ferry power source 270, the power source 280, and/or the auxiliary RESS 243 of FIG. 2 or any other suitable power source.

The accessory PDU 310 can connect to and/or communicate with another ESE 395. The ESE 395 can be the ESE 220 of FIG. 2. The accessory PDU 310 can control the ESE 395 and/or the AC power source 360 to distribute electrical power received from the ESE 395 and/or the AC power source 312 to the electrically powered accessory 340 and/or to the accessory RESS 341. The accessory PDU 310 can also control the electrically powered accessory 340 to distribute electrical power to the accessory RESS 341 (e.g., charging the accessory RESS 341), and/or control the accessory RESS 341 to distribute electrical power to the electrically powered accessory 340 (e.g., operating/running the electrically powered accessory 340).

Figure 4A:
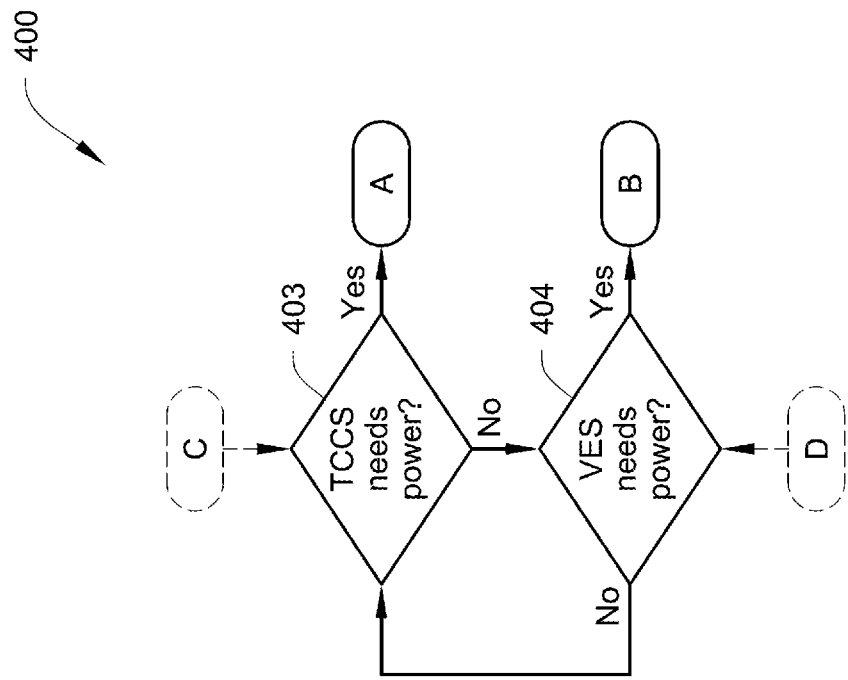
FIGS. 4A-4C are flow charts illustrating a method for interfacing between a VES of a vehicle and an electrically powered accessory that provides climate control within an internal space moved by the vehicle, according to one embodiment.
Figure 4B:
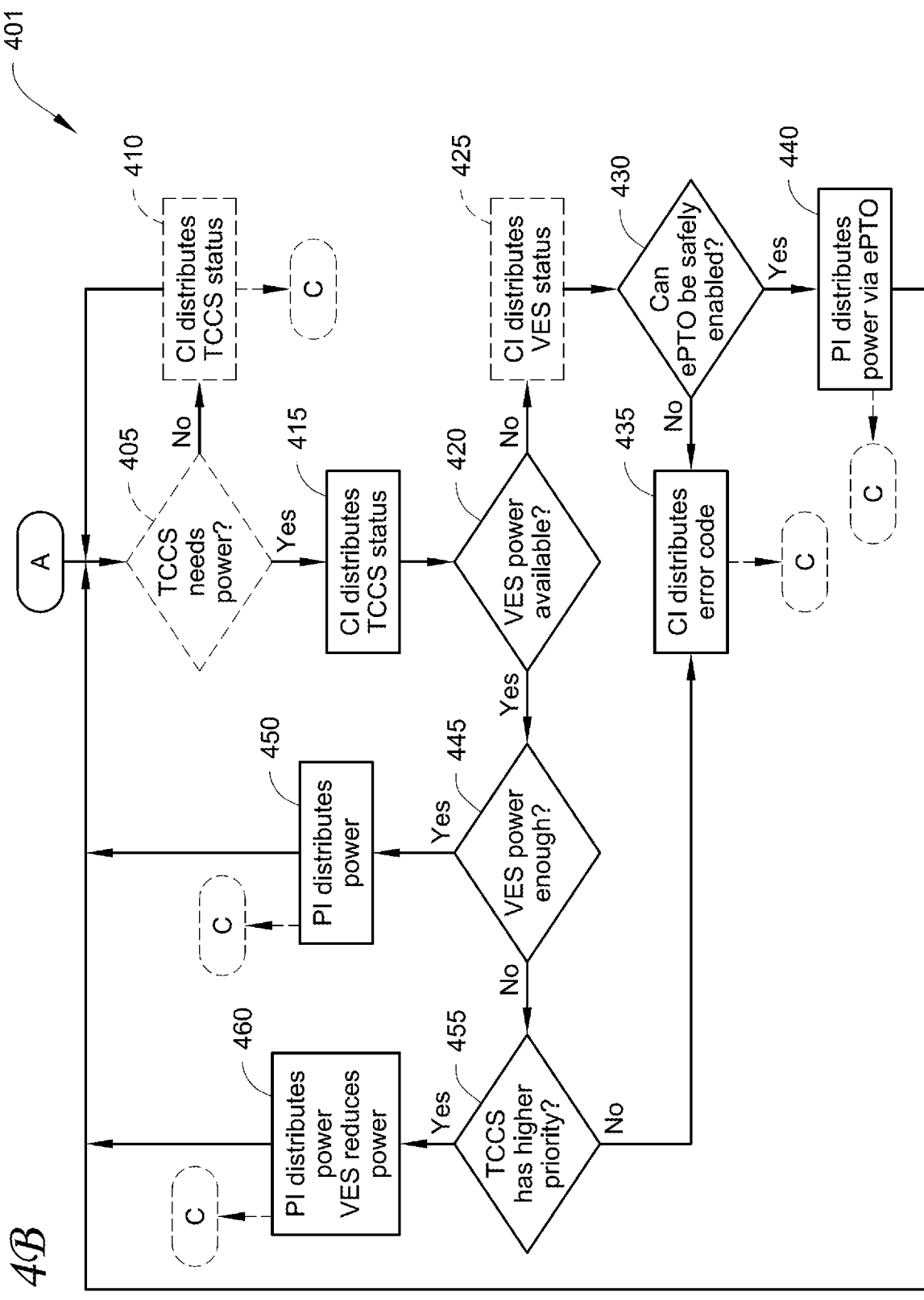
Figure 4C:
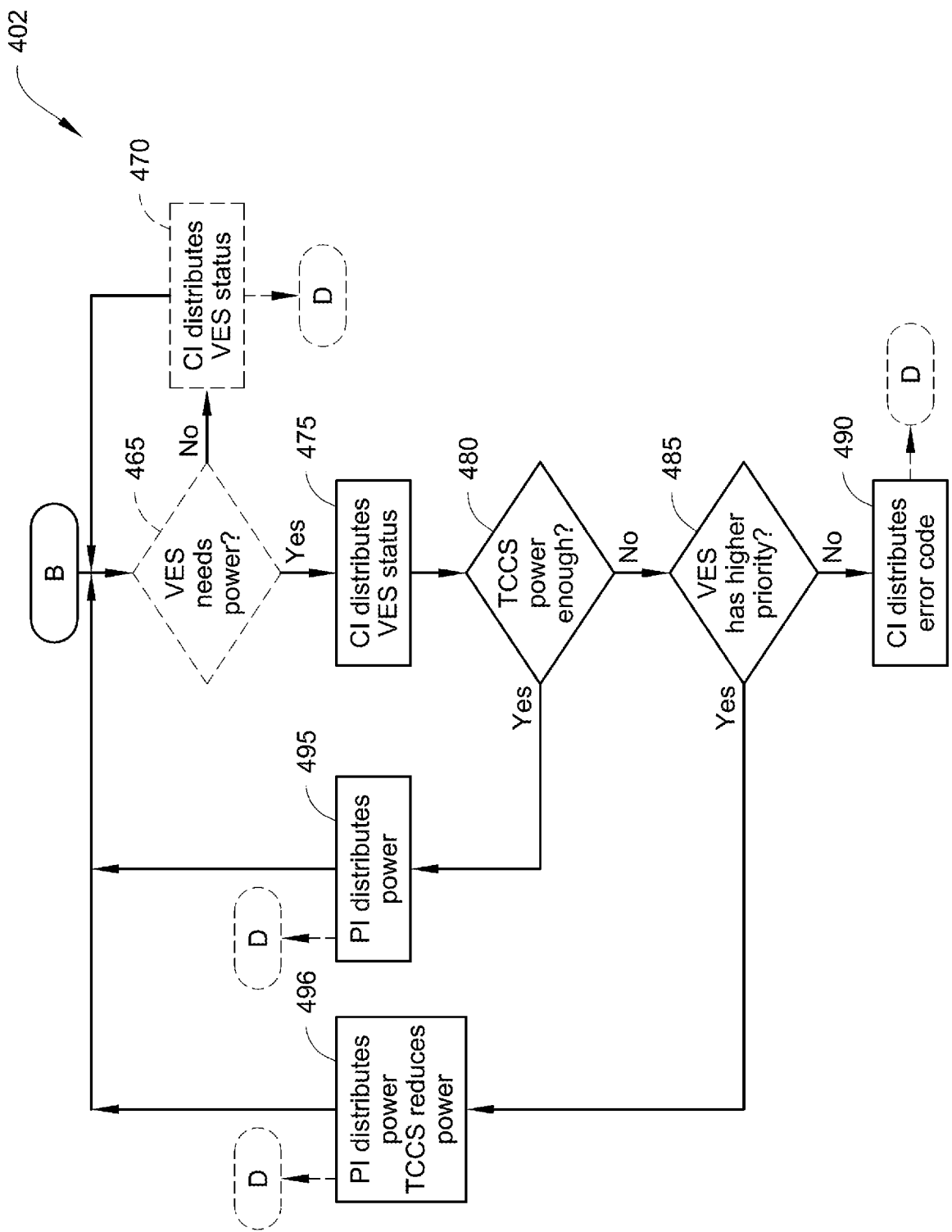

FIGS. 4A-4C are flow charts illustrating a method for interfacing between a VES of a vehicle and an electrically powered accessory that provides climate control within an internal space moved by the vehicle, according to one embodiment.

While the embodiments described below illustrate different embodiments of an electrically powered accessory using a TCCS as an example, it will be appreciated that the electrically powered accessory is not limited to a climate control unit (CCU) of a transport climate control system. In other embodiments, the electrically powered accessory can be, for example, a crane attached to a vehicle, a cement mixer attached to a truck, one or more food appliances of a food truck, etc. It will be appreciated that in the embodiments disclosed herein, when a TCCS is referred to, it can also refer to an electrically powered accessory.

It will be appreciated that interfacing can be achieved by, e.g., an interface system for connecting the vehicle and the electrically powered accessory (e.g., the TCCS). The interface system can include a two-way (bi-directional, from the vehicle to the TCCS and/or from the TCCS to the vehicle) communication interface (CI) that connects a VES controller of the VES of the vehicle and a TCCS controller of the TCCS. The VES controller can be, e.g., a controller of the PDU 235 and/or a controller of the vehicle 230 of FIG. 2 and/or a battery management system (BMS) controller. The TCCS controller can be, e.g., the controller 215 and/or a controller of the electrical accessary 240 of FIG. 2. The two-way communication interface can be configured to distribute a TCCS status from the TCCS controller to the VES controller, and can be configured to distribute a VES status from the VES controller to the TCCS controller. The two-way communication interface can utilize any suitable communications including powerline communications, Pulse Width Modulation (PWM) communications, Local Interconnect Network (LIN) communications, Controller Area Network (CAN) communications, and/or Pilot signal analog feedback, etc. The two-way communication interface can utilize any suitable communications including wired and/or wireless, analog and/or digital communications. In one embodiment, the two-way communication interface can include communications over telematics. The TCCS can include sensors (e.g., temperature, pressure, voltage, current, battery status, and/or battery charging level sensor, etc.). The TCCS can communicate the status (e.g., status of the sensors and/or charge status) to the TCCS controller so that the TCCS controller can determine a TCCS status (e.g., power demand/request for an operation of the TCCS, power availability of the TCCS, charging level of the TCCS energy storage, etc.). The VES can include sensors (e.g., temperature, pressure, voltage, current, battery status, and/or battery charging level sensor, etc.). The VES can communicate the status (e.g., status of the sensors and/or charge status) to the VES controller so that the VES controller can determine a VES status (e.g., power demand/request for an operation of the VES, power availability of the VES, charging level of the VES energy storage, etc.). It will be appreciated that the CI can include the VES controller, the vehicle PDU controller, the TCCS controller, the BMS controller, the accessory PDU controller, the components (e.g., vehicle sensors, TCCS sensors, etc.) that communicate with the controller(s), and/or the communication lines, etc.

It will be appreciated that power sources (e.g., rechargeable power sources) have electrical energy, and can provide electrical power (energy over time) to run electrical components. Energy needed for a TCCS operation can be predicted based on forecasted power requirements. For example, a TCCS operation can be maintaining the temperature of a cargo to be at or below a setpoint temperature for a determined period of time (e.g., from the start of the delivery of the cargo to the end of the delivery or to the next nearest charging station). Power requirements for such operation can be predicted based on, e.g., the TCCS operational parameters, temperature control settings (e.g., tight temperature control, lower setpoint temperature, loose temperature control, etc.), road/route conditions (e.g., uphill, downhill, altitude, elevation, traffic information, etc.), and/or ambient temperature, etc. The amount of power/energy provided by the power sources of the TCCS may or may not be sufficient to satisfy the power demand of the TCCS operation. Similarly, energy needed for a VES operation can be predicted based on forecasted power requirements. For example, a VES operation can be driving the vehicle at/above/below a certain speed to pass a predetermined distance (e.g., railroad track, a high speed highway, etc.). Power requirements for such operation can be predicted based on, e.g., the road/route conditions (e.g., uphill, downhill, altitude, elevation, traffic information, etc.), the speed requirement, the weight of the vehicle and/or the cargo, etc. The amount of power/energy provided by the power sources of the VES may or may not be sufficient to satisfy the power demand of the VES operation.

The TCCS status can include one or more of power demand (how much power is needed) for an operation of the TCCS, power availability of the power sources of the TCCS, charging level of the TCCS rechargeable energy storage, priority level of the TCCS operation, route/road information, TCCS sensor sensed data, allocation of power, etc. The VES status can include one or more of power demand (how much power is needed) for an operation of the VES, power availability of the power sources of the VES, charging level of the VES rechargeable energy storage, priority level of the VES operation, route/road information, VES sensor sensed data, allocation of power, etc. It will be appreciated that the TCCS status and/or the VES status can be communicated to a user interface (wirelessly or via wire) to inform a user (driver, operator, etc.). For example, the user interface can display TCCS run-time remaining (based on the available power from the power sources of the TCCS and/or the TCCS operational parameters) and/or the vehicle run-time remaining to the user as e.g., X hours Y minutes.

It will also be appreciated that the interface system can include a power interface (PI) that connects a vehicle energy source of the VES to the TCCS and connects a TCCS energy source of the TCCS to the VES. The power interface can be two-way power interface. The power interface can be configured to distribute power from the vehicle energy source of the VES to the TCCS when a VES instruction (e.g., indicating providing power to the TCCS, etc.), that is based on the TCCS status (the amount of power needed (which can be determined by the TCCS controller based on e.g., the TCCS operational parameters, temperature control settings, etc.), the priority level of the TCCS operation, etc. for e.g., determining whether the VES has enough power and whether the TCCS or the VES operation has a higher priority level, etc.), is received from the VES controller, and can be configured to distribute power from the TCCS energy source to the VES when a TCCS instruction (e.g., indicating providing power to the VES, etc.), that is based on the VES status (the amount of power needed, the priority level of the VES operation, etc. for e.g., determining whether the TCCS has enough power and whether the TCCS or the VES operation has a higher priority level, etc.), is received from the TCCS controller. It will be appreciated that PI can include the VES power sources, the TCCS power sources, the vehicle PDU, the accessory PDU, the components (e.g., compressor, fan(s), RESS, etc.) that powered by the power source(s), and/or the power lines, etc.

It will be further appreciated that when the power interface is configured to distribute power from the vehicle energy source of the VES to the TCCS, the VES controller is configured to update the VES status (e.g., the status about "charge time remaining" during charging the vehicle, and/or "power available from the VES", etc.)

In FIG. 4A, the method 400 begins at 403 where the TCCS controller is configured to determine whether the TCCS needs power. The TCCS controller can obtain sensed data from TCCS sensors, and determine whether the TCCS needs power for e.g., an operation such as running or operating the TCCS to e.g., control the temperature/humidity/airflow (air quality) of the climate controlled space, based on the sensed data. Determining whether the TCCS needs power includes determining a TCCS power consumption forecast for a TCCS operation and determining the required energy for the TCCS operation. If the TCCS controller determines that the TCCS energy source can provide sufficient (greater than or equal to) power (e.g., based on the charging level of the TCCS energy storage and/or the available power from other TCCS energy sources, etc.) to satisfy the power demand/request of the TCCS operation (e.g., based on the setpoints of temperature and/or humidity and/or airflow, the currently sensed temperature and/or humidity and/or airflow of the climate controlled space, and/or the TCCS system output and/or capacity), the TCCS controller determines that the TCCS does not need power, and the method 400 then proceeds to 404. If the TCCS controller determines that the TCCS energy source cannot provide sufficient power to satisfy the power demand of the TCCS operation, the TCCS controller determines that the TCCS needs power, and the method 400 then proceeds to A.

It will be appreciated that TCCS energy source can include one or more of an auxiliary energy source (e.g., battery pack), a transport refrigerant unit (TRU) power source engine, an electric auxiliary power unit (APU) auxiliary energy storage, a solar power source, a Genset power source, a fuel cell power source (which can provide, e.g., DC power), a micro-turbine with a generator (to provide electrical power), and/or a liftgate energy storage (to provide power for opening/closing liftgate).

It will also be appreciated that the auxiliary energy source can be used to provide power to the TCCS. The auxiliary energy source can be the power source of the TCCS if e.g., no engine exists. The TRU power source engine can be engine with electric generator and/or inverter and/or converter. The TRU power source engine can be used to power e.g., HVACR system and/or to export power (e.g., AC or DC power via the inverter and/or converter). The Genset power source can be e.g., under-mounted on trailer.

At 404, the VES controller is configured to determine whether the VES needs power. The VES controller can obtain sensed data from the vehicle sensors, and determine whether the VES needs power for e.g., an operation such as driving and/or charging the vehicle, based on the sensed data. If the VES controller determines that the VES energy source can provide sufficient (greater than or equal to) power (e.g., based on the charging level of the VES energy storage) to satisfy the power demand/request of the VES operation (e.g., based on the distance of driving, and/or the VES system output and/or capacity), the VES controller determines that the VES does not need power, and the method 400 then proceeds to 403. If the VES controller determines that the VES energy source cannot provide sufficient power to satisfy the power demand of the VES operation, the VES controller determines that the VES needs power, and the method 400 then proceeds to B.

It will be appreciated that the VES energy source can include one or more of a (main) vehicle RESS, a hybrid generator (e.g., range extender), charging via DC fast charge or an OBC, and/or an alternator, etc.

It will be appreciated that in FIG. 4A, the VES controller can determine whether the VES needs power at 404 concurrently or before the TCCS controller determines that the TCCS needs power at 403. It will also be appreciated that method 400 can proceed from C (see FIG. 4B) to 403 and/or from D (see FIG. 4C) to 404.

In FIG. 4B, the method 401 begins at A. It will be appreciated that method 401 can be a part of method 400 or an independent method. When method 401 is an independent method, the method 401 begins at A and then proceeds to 405, where the TCCS controller is configured to determine whether the TCCS needs power. The TCCS controller can obtain sensed data from the sensors, and determine whether the TCCS needs power for e.g., an operation such as running or operating the TCCS to e.g., control the temperature/humidity/airflow (air quality) of the climate controlled space, based on the sensed data of the TCCS. If the TCCS controller determines that the TCCS energy source can provide sufficient (greater than or equal to) power (e.g., based on the charging level of the TCCS energy storage and/or the available power from other TCCS energy sources, etc.) to satisfy the power demand/request of the TCCS operation (e.g., based on the setpoints of temperature and/or humidity and/or airflow, the currently sensed temperature and/or humidity and/or airflow of the climate controlled space, and/or the TCCS system output and/or capacity), the TCCS controller determines that the TCCS does not need power, and the method 401 then proceeds to 410. If the TCCS controller determines that the TCCS energy source cannot provide sufficient power to satisfy the power demand of the TCCS operation, the TCCS controller determines that the TCCS needs power, and the method 401 then proceeds to 415.

At 410, the two-way communication interface can optionally distribute the TCCS status (e.g., status indicating that TCCS does not need power, a request to disable or turn off ePTO, etc.) from the TCCS controller to the VES controller. The method 401 then proceeds back to 405. In one embodiment where the method 401 is a part of method 400, method 401 then proceeds to C instead of 405.

When method 401 is a part of method 400, the method 401 begins at A and then proceeds to 415. At 415, the two-way communication interface can distribute the TCCS status (e.g., TCCS needs power, the amount of power needed for an operation of the TCCS, the priority level of the operation, a request to enable or turn on the ePTO, etc.) from the TCCS controller to the VES controller. The method 401 then proceeds to 420.

At 420, the VES determines whether the VES energy source can provide sufficient (greater than or equal to) power (e.g., based on the charging level of the VES energy storage) to satisfy the power demand/request of the TCCS operation. if the VES controller determines that the VES energy source can provide sufficient power to satisfy the power demand/request of the TCCS operation, the VES controller determines that VES has power available for the power demand/request of the TCCS operation, and the method 401 proceeds to 445. If the VES controller determines that the VES energy source cannot provide sufficient power to satisfy the power demand/request of the TCCS operation, the VES controller determines that VES does not have power available for the power demand/request of the TCCS operation, and the method 401 proceeds to 425. It will be appreciated that 425 can be optional, and in such embodiments, the method 401 proceeds to 430 instead of 425.

At 425, the two-way communication interface can distribute the VES status (e.g., the VES does not have power available for the power demand of the TCCS operation, etc.) from the VES controller to the TCCS controller. The method 401 then proceeds to 430.

At 430, the VES controller validates whether the ePTO can be safely enabled. For example, when the vehicle's operation is at a non-negotiable priority level (e.g., the vehicle is passing train tracks, performing priority movement, and/or in a limp-home mode), the ePTO cannot be safely enabled. If the ePTO can be safely enabled, the method 401 then proceeds to 440. If the ePTO cannot be safely enabled, the method 401 then proceeds to 435.

At 440, the VES controller enables (or turns on) the ePTO. It will be appreciated that the vehicle system enabling signal can be either on or off when the ePTO is enabled. The power interface can be configured to distribute power from the VES to the TCCS (for the TCCS operation) via ePTO. The method 401 then proceeds to C (if the method 401 is a part of the method 400) or 405.

At 435, the two-way communication interface can distribute information such as an error code (e.g., indicating that the power demand of the TCCS operation cannot be satisfied, etc.) from the VES controller to the TCCS controller. In one embodiment, the two-way communication interface can distribute the error code from the VES controller to a user interface. The user interface can be local to the vehicle or TCCS, or remote from the vehicle or TCCS. The user can be a driver, a fleet manager, a service person, etc. The error code can be communicated e.g., over telematics. In one embodiment, a user intervention may be needed to exit from 435 to C or 405 (paths not shown), via e.g., the user interface.

At 445, the VES controller determines whether the VES energy source can provide sufficient (greater than or equal to) power (e.g., based on the charging level of the VES energy storage) to satisfy both the power demand/request of the TCCS operation and the power demand/request of the VES operation (e.g., driving the vehicle). If the VES controller determines that the VES energy source can provide sufficient power to satisfy both the power demand/request of the TCCS operation and the power demand/request of the VES operation, the VES controller determines that VES has enough power for both the power demands, and the method 401 then proceeds to 450. If the VES controller determines that the VES energy source cannot provide sufficient power to satisfy both the power demand/request of the TCCS operation and the power demand/request of the VES operation, the VES controller determines that VES does not have enough power for both the power demands, and the method 401 then proceeds to 455.

It will be appreciated that the controller can be configured to determine the power requirements (demand/request) of an operation (e.g., TCCS and/or VES operation). The power requirements of an operation can be forecasted energy demands determined by analyzing power demands and their current and future durations (of the operation) and a number of events (that can contribute to the power demands of the operation). The controller can be configured to determine an energy gap (if any), based on the forecasted power requirements for the operation and a determination of the reserved energy available for the operation. If there is an energy gap (the reserved energy available is less than the forecasted power requirements), priority analysis can then be done to reduce the overall energy needed by e.g., reducing the power of the demand and/or the duration of the power demands of an operation (e.g., lower priority operation).

At 450, the power interface can be configured to distribute power from the VES energy source to the TCCS (for the TCCS operation). The method 401 then proceeds to C or 405.

At 455, the VES controller determines whether the TCCS operation has a higher priority level than the VES operation. If the VES controller determines that the TCCS operation has a higher priority level than the VES operation, the method 401 then proceeds to 460. If the VES controller determines that the TCCS operation does not have a higher priority level than the VES operation, the method 401 then proceeds to 435.

The priority level of a TCCS operation and/or the priority level of a VES operation can be predetermined and saved in e.g., a memory of the VES controller and/or the TCCS controller. In one embodiment, the priority level of a TCCS operation and/or the priority level of a VES operation can be determined by the VES controller and/or the TCCS controller, by using the sensed VES data (e.g., the location (including elevation, altitude, grade/terrain of the route, etc.) of the vehicle (e.g., whether the vehicle is passing a railroad track, etc.), the ambient temperature, etc.) and/or TCCS data (the setpoints of temperature/humidity/airflow and the currently sensed temperature/humidity/airflow of the climate controlled space), and/or by using an input from a user (driver, operator, etc.) via the user interface (and communicated to the VES controller and/or the TCCS controller). It will be appreciated that in some embodiments, the controller can obtain the data (e.g., the sensed data such as the whether/temperature data, the predetermined priority level data, etc.) via telematics.

Each TCCS operation and VES operation can have a priority level. Each priority level can be represented by a unique number indicating an order of the priority level. For example, a smaller number can indicate a higher priority level, or a bigger number can indicate a higher priority level.

It will be appreciated that there can be a set of operations that have a non-negotiable priority level (highest priority level). These can include, for example, operations that are related to a user's (driver, operator, etc.) safety. For example, when the vehicle is passing a railroad track, completing the passing is a non-negotiable priority task/operation. Other examples include when a vehicle is on a high speed highway with minimum speed limit, driving at a speed exceed the minimum speed limit is a non-negotiable priority task/operation. It will be appreciated that telematics (e.g., GPS) can be used to obtain information (such as sensing train tracks, detecting high speed highways, etc.) to provide input to the controller to determine whether an operation has a non-negotiable priority level. There can also be a set of operations that have a negotiable priority level (i.e., those tasks/operations that can postpone receiving power to higher priority level tasks/operations).

In some embodiments, power demand/request from the TCCS to keep the cargo (e.g., produce, frozen foods, pharmaceuticals, etc.) safe and/or fresh can have different negotiable priorities (e.g., the cargo can be regulated by government bodies or of high economic value). The regulated loads/cargo can include pharmaceuticals, meat, seafood, produce, diary, and/or frozen foods, etc. (listed in a decreased order of priority). Loads/cargo having high economical value can include beverages, canned foods, paint, flowers, and/or plants, etc. (listed in decreased order of priority). The regulated loads/cargo have higher priority than loads/cargo having high economical value.

In some embodiments, a power demand/request from the VES to operate the vehicle can have different negotiable priorities (e.g., charging, driving with a restricted speed, etc. (listed in an increased order of priority)).

It will be appreciated that a user interface can be used to intervene/take control/override the priority level of a particular operation. For example, the user can escalate an operation to a higher priority level (or deescalate an operation to a lower priority level), and the two-way communication interface can distribute the updated priority level from the user interface to the VES and/or TCCS controllers. The user interface can be implemented via, e.g., an HMI, an infotainment system (e.g., for the driver), a smartphone app (e.g., text/status message, etc.), a web page (e.g., for remote users), etc. The user (e.g., driver, operator, etc.) can provide input (regarding the priority level of the particular operation) via the user interface. For example, the user can indicate "safe" (for the vehicle and/or the user) via the user interface to indicate that the vehicle is parked in an off roadway lot, even when the controller determines that the operation of the vehicle has a non-negotiable priority level. As such, the priority level of the operation of the vehicle can be deescalated from the non-negotiable priority level to a level that is lower than the priority level of a TCCS operation (e.g., to maintain the temperature of the cargo at/below the setpoint to save the load). The user can also indicate "save load" via the user interface (to escalate the priority level of the TCCS operation to be higher than the priority level of the vehicle operation such as driving) so that in addition to dedicating the vehicle energy to the TCCS, the vehicle can be prevented from moving to conserve energy and the user can be notified to call a recharging/tow truck.

At 460, the power interface can be configured to distribute power from the VES energy source to the TCCS (for the TCCS operation) and instruct the vehicle to reduce power consumption. As such, in some embodiments, the VES can be configured to operate in an energy saving mode (because the VES does not have enough power for both the TCCS and the VES power demands), until e.g., power can be added to the vehicle (e.g., through charging, etc.). For example, the two-way communication interface can distribute a warning/ notification (e.g., the vehicle needs to be charged in a predetermined period of time, the vehicle has to be stayed on flat ground, etc.) to the user via e.g., the user interface (e.g., an HMI, an infotainment system (e.g., for the driver), a smartphone app (e.g., text/status message, etc.), a web page (e.g., for remote users), etc.). The VES can be configured to restricted peak acceleration of the vehicle. The VES can be configured to operate the vehicle with a restricted speed, in a "limp home" mode, etc. The method 401 then proceeds to C or 405.

Embodiments disclosed herein can e.g., allow power transfer from the VES to the TCCS for autonomous and continuous TCCS operation or battery charging, especially in a vehicle charging scenario where the power availability to ePTO and/or accessory loads (e.g., the TCCS) can be limited or unavailable during certain use conditions. Embodiments disclosed herein can help to prevent a load loss condition due to e.g., insufficient power to operate the TCCS. Embodiments disclosed herein can help to ensure the power path to the TCCS remains active, even if there is no charge demand from the VES. Embodiments disclosed herein can help to mitigate the risk and preserve critical loads/cargo.

Embodiments disclosed herein do not require additional charge/interface hardware at a customer depot (e.g., a charging station) to support the TCCS other than the standard vehicle charge interface/port. It will be appreciated that in some embodiments, additional hardware (e.g., different charging port, etc.) can be used for providing power to the VES and to the TCCS directly, or providing separate plugs/charging ports for TCCS utility power supply and for the vehicle charging (2-plug solution), which can require additional infrastructure at the customer site (e.g., the charging station).

Embodiments disclosed herein can help to notify a user when e.g., the power of the VES and/or TCCS is running low. Embodiments disclosed herein can help with communicating power/charging needs (of the VES and/or TCCS) to other vehicles (e.g., adjacent vehicles, via telematics) for charging optimization and/or power demands. For example, an adjacent vehicle can serve as a charging vehicle when a power demand (from the VES of the vehicle and/or the TCCS) is sent to the adjacent vehicle.

In FIG. 4C, the method 402 begins at B. It will be appreciated that method 402 can be a part of method 400 or an independent method. When method 402 is an independent method, the method 402 begins at B and then proceeds to 465, where the VES controller is configured to determine whether the VES needs power. The VES controller can obtain sensed data from the sensors, and determine whether the VES needs power for e.g., an operation such as driving or charging the vehicle, based on the sensed data. If the VES controller determines that the VES energy source can provide sufficient (greater than or equal to) power (e.g., based on the charging level of the VES energy sources, etc.) to satisfy the power demand/request of the VES operation (e.g., based on the distance of driving, and/or the VES system output and/or capacity), the VES controller determines that the VES does not need power, and the method 402 then proceeds to 470. If the VES controller determines that the VES energy source cannot provide sufficient power to satisfy the power demand of the VES operation, the VES controller determines that the VES needs power, and the method 402 then proceeds to 475.

At 470, the two-way communication interface can optionally distribute the VES status (e.g., VES does not need power, etc.) from the VES controller to the TCCS controller. The method 402 then proceeds back to 465. In one embodiment, where the method 402 is a part of method 400, method 402 then proceeds to D instead of 465.

When method 402 is a part of method 400, the method 402 begins at A and then proceeds to 475. At 475, the two-way communication interface can distribute the VES status (e.g., VES needs power, the amount of power needed for an operation of the VES, the priority level of the operation, etc.) from the VES controller to the TCCS controller. The method 402 then proceeds to 480.

At 480, the TCCS controller determines whether the TCCS energy source can provide sufficient (greater than or equal to) power (e.g., based on the charging level of the TCCS energy storage and/or the available power from other TCCS energy sources, etc.) to satisfy both the power demand/request of the VES operation (e.g., driving or charging the vehicle) and the power demand/request of the TCCS operation (e.g., based on the setpoints of temperature and/or humidity and/or airflow, the currently sensed temperature and/or humidity and/or airflow of the climate controlled space, and/or the TCCS system output and/or capacity). If the TCCS controller determines that the TCCS energy source can provide sufficient power to satisfy both the power demand/request of the VES operation and the power demand/request of the TCCS operation, the TCCS controller determines that TCCS has enough power for both the power demands, and the method 402 then proceeds to 495. If the TCCS controller determines that the TCCS energy source cannot provide sufficient power to satisfy both the power demand/request of the VES operation and the power demand/request of the TCCS operation, the TCCS controller determines that TCCS does not have enough power for both the power demands, and the method 402 then proceeds to 485.

At 495, the power interface can be configured to distribute power from the TCCS energy source to the VES (for the VES operation). The method 402 then proceeds to D or 465.

At 485, the TCCS controller determines whether the VES operation has a higher priority level than the TCCS operation. If the TCCS controller determines that the VES operation has a higher priority level than the TCCS operation, the method 402 then proceeds to 496. If the TCCS controller determines that the VES operation does not have a higher priority level than the TCCS operation, the method 402 then proceeds to 490. See step 455 of FIG. 4B for description of operation priority levels.

At 490, the two-way communication interface can distribute information such as an error code (e.g., indicating that the power demand of the VES operation cannot be satisfied, etc.) from the TCCS controller to the VES controller. In one embodiment, the two-way communication interface can distribute the error code from the TCCS controller to a user interface. The user interface can be local to the vehicle or TCCS, or remote from the vehicle or TCCS. The user can be a driver, a fleet manager, a service person, etc. The error code can be communicated e.g., over telematics. In one embodiment, a user intervention may be needed to exit from 490 to D or 465 (paths not shown), via e.g., the user interface.

At 496, the power interface can be configured to distribute power from the TCCS energy source to the VES (for the VES operation). As such, in some embodiments, the TCCS can be configured to operate in an energy saving mode (or "reduced power operational mode", because the TCCS does not have enough power for both the TCCS and the VES power demands). It will be appreciated that the TCCS energy source can include an auxiliary energy source (e.g., a battery pack), a TRU power source engine, an electric auxiliary power unit (APU) auxiliary energy storage, a solar power, a Genset, a fuel cell, a micro-turbine with a generator, and/or a liftgate energy storage, etc, each having a priority level associated with a unique number. As such, for the TCCS to operate in an energy saving mode, the power (to be distributed to the VES) can be first distributed from the TCCS energy source having a lowest priority level to the VES. For example, the liftgate energy storage (for operating the liftgate of the cargo space) can have the lowest priority level over the VES operation and/or other TCCS operations, and can be used up first to provide power to the VES. Next if the Genset is available and not powering the TRU, which typically indicating the Genset is redundant power source (e.g., as a backup power source for TCCS climate control) and can be used up to provide power to the VES. Then next if a tight climate control is not required, the TRU power source (e.g., engine driven generator, fuel cell power source, auxiliary battery pack, etc.) can be used to provide power to the VES. Then next if there is a true emergency (e.g., the VES operation has a non-negotiable priority that may impact a user's safety, or an override from a user via the user interface, etc.), all available TCCS power can be used to provide power to the VES, including allowing the TCCS to lose climate control over the cargo. If the TCCS power provided to the VES is not sufficient for a normal operation of the VES, the vehicle can work in an e.g., "limp home" mode (e.g., with restricted speed, etc.). It will be appreciated that running in a reduced operation mode (e.g., "limp home" mode) can lower the power demand over time and thus the energy required for the operation. The method 402 then proceeds to D or 465.

It will be appreciated that when the power interface distributes power from the TCCS energy source to the VES, the power can be distributed to the PDU of the vehicle for power distribution. The power interface can include an inductive charging type of link through e.g., the fifth wheel hitch, hardwired and rigid or stinger flexible cable, a 7-way trailer power connector (e.g., multi-pole, JS60 connector), a separate high voltage DC link, a separate high voltage AC link, etc.

It will also be appreciated that when the power interface distributes power from the TCCS energy source to the VES, consideration can be taken when the VES and/or TCCS controller obtains information (e.g., about the closest charging station) via, e.g., telematics communication link. As such, the energy from the TCCS can be available to get the vehicle to the charging station in time before all TCCS and/or VES energy sources are sufficiently discharged. It will be appreciated that future charging needs can be based on energy calculation.

It will further be appreciated that when the power interface distributes power from the TCCS energy source to the VES, consideration can be taken when the VES and/or TCCS controller determines that the vehicle can e.g., move to a safe location and use available engine (e.g., in TRU/Genset) and/or solar power source to charge the vehicle. During the charging, the trip of the vehicle can be recalculated (e.g., using telematics in concert with e.g., the fleet management, etc.), and the vehicle can be charged to support the newly calculated trip.

Embodiments disclosed herein can help to operate the vehicle when the vehicle lacks power due to e.g., discharging and/or failure of the onboard rechargeable energy storage system, especially when the vehicle is stranded in a location where the vehicle must move from to e.g., wait for recovery.

Figure 5:
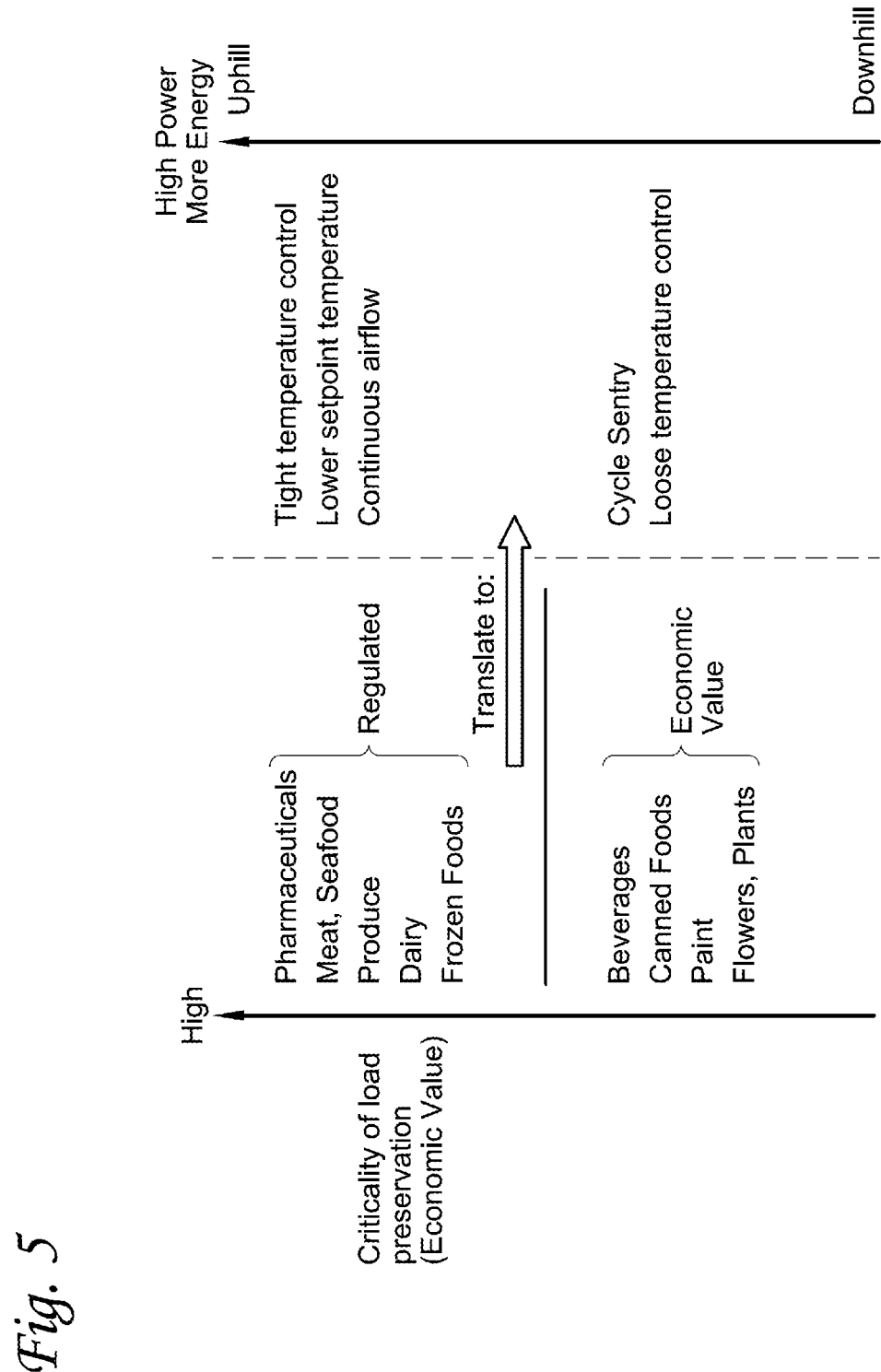
FIG. 5 is a chart illustrating different priority levels for negotiable tasks/operations/loads, according to one embodiment.

FIG. 5 is a chart illustrating different priority levels for negotiable tasks/operations/loads, according to one embodiment.

It will be appreciated that operations that have a non-negotiable priority level (highest priority level) can include, for example, operations that are related to a user's (driver, operator, etc.) safety. For example, when the vehicle is passing a railroad track, completing the passing is a non-negotiable priority task/operation. Another example is when a vehicle is on a high speed highway with minimum speed limit, driving at a speed exceed the minimum speed limit is a non-negotiable priority task/operation. Other examples include the vehicle is performing priority movement and/or in a limp-home mode, battery pack is in unsafe mode (overcharge, over-discharge), etc.

There can also be a set of operations that have a negotiable priority level (i.e., those tasks/operations that can postpone receiving power to higher priority level tasks/operations, see FIG. 5). The negotiable priority levels are predetermined (unless being overridden by a user). As shown in FIG. 5, TCCS to prevent the cargo from being damaged by, e.g., maintaining the temperature of the cargo at or below a setpoint temperature. Cargo can include regulated cargo (pharmaceuticals, meat, seafood, produce, diary, and/or frozen foods, etc., listed in a decreased order of the priority level) and/or cargo having economical value (beverages, canned foods, paint, flowers, and/or plants, etc., listed in a decreased order of the priority level). The regulated cargo has a higher priority level than the cargo having economical value.

It will be appreciated that different products/cargo can have different TCCS operational parameters. For example, pharmaceuticals can require a different operational mode (tight temperature control) which can be more energy intensive than other cargo. Produce such as berries can require constant airflow which can require additional energy compared to cargo with discontinuous airflow. As such, the priority level of the regulated cargo and/or of cargo having economical value can be translated to different operational control: tight temperature control, lower setpoint temperature, continuous airflow, cycle sentry, and/or loose temperature control, etc., listed in a decreased order of power requirement. Similarly, vehicle operations (e.g., uphill, downhill, etc. listed in a decreased order of power requirement.) can have different priority levels.

There can further be a set of operations that have a dynamic priority level (random occurring status/event causing change in priority level). For example, for frozen foods, some customers require deep-frozen temperature (e.g., at or around −20° F.) and some customers require frozen temperature (e.g., at or around 10° F.). Deep-frozen can be more energy intensive than frozen. Such predetermined customer preferences can be included as a factor to determine operational parameters. The user (e.g., driver, operator, etc.) can be presented with the predetermined customer preferences so that the user can communicate the preferences with the controller via the user interface, which can cause change in priority level of the TCCS operation (dynamic priority level).

The user can provide input (regarding the priority level of the particular operation) via the user interface (at any time). As such, the priority level of the operation can be escalated or deescalated (override the priority level of an operation).

ASPECTS

It is to be appreciated that any of aspects 1-14 can be combined with any of aspects 15-20, and that any of aspects 21-32 can be combined with any of aspects 33-38.

Aspect 1. An interface system for communicating with a vehicle and a transport climate control system (TCCS) that provides climate control within an internal space moved by the vehicle, the interface system comprising:
- a two-way communication interface that interfaces with a vehicle electrical system (VES) controller of a VES of the vehicle and a TCCS controller of the TCCS, and
- a power interface that interfaces with a vehicle energy source of the VES to the TCCS,
- wherein the two-way communication interface is configured to distribute a TCCS status from the TCCS controller to the VES controller, and is configured to distribute a VES status from the VES controller to the TCCS controller, and
- wherein the power interface is configured to distribute power from the vehicle energy source of the VES to the TCCS when a VES instruction, that is based on the TCCS status, is received from the VES controller.

Aspect 2. The interface system of aspect 1, wherein the power interface interfaces with a TCCS energy source of the TCCS to the VES, and
- the power interface is configured to distribute power from the TCCS energy source to the VES when a TCCS instruction, that is based on the VES status, is received from the TCCS controller.

Aspect 3. The interface system of aspect 2, wherein when the vehicle energy source of the VES is not sufficient to satisfy a power demand for an operation of the VES, the two-way communication interface is configured to distribute the VES status from the VES controller to the TCCS controller.

Aspect 4. The interface system of aspect 3, wherein when the TCCS energy source is sufficient to satisfy a power demand for an operation of the TCCS, or a priority level of the operation of the VES is higher than a priority level of the operation of the TCCS, the two-way communication interface is configured to receive the TCCS instruction from the TCCS controller.

Aspect 5. The interface system of aspect 4, wherein the priority level of the operation of the TCCS is determined by a criticality of preservation of a load, the load includes regulated loads and/or loads having economical value.

Aspect 6. The interface system of aspect 5, wherein the regulated loads include pharmaceuticals, meat, seafood, produce, diary, and/or frozen foods,
- wherein the loads having economical value include beverages, canned foods, paint, flowers, and/or plants.

Aspect 7. The interface system of any one of aspects 2-6, wherein when the TCCS energy source is not sufficient to satisfy a power demand for an operation of the TCCS, the two-way communication interface is configured to distribute the TCCS status from the TCCS controller to the VES controller.

Aspect 8. The interface system of aspect 7, wherein when the vehicle energy source of the VES is sufficient to satisfy a power demand for an operation of the VES, or a priority level of the operation of the TCCS is higher than a priority level of the operation of the VES, the two-way communication interface is configured to receive the VES instruction from the VES controller.

Aspect 9. The interface system of any one of aspects 1-8, wherein when the power interface distributes power from the vehicle energy source of the VES to the TCCS, the power interface distributes power to the TCCS via electric power take off (ePTO).

Aspect 10. The interface system of any one of aspects 2-9, wherein the TCCS energy source includes an auxiliary battery pack, a transport refrigerant unit (TRU) power source engine, an electric auxiliary power unit (APU) auxiliary energy storage, a solar power, a Genset, a fuel cell, a micro-turbine with a generator, and/or a liftgate energy storage.

Aspect 11. The interface system of any one of aspects 1-10, wherein the two-way communication interface includes a Controller Area Network (CAN).

Aspect 12. The interface system of any one of aspects 1-11, wherein the two-way communication interface includes telematics.

Aspect 13. The interface system of any one of aspects 1-12, wherein when the power interface is configured to distribute power from the vehicle energy source of the VES to the TCCS, the power is determined based on current and forecasted power demands of the TCCS that form an energy requirement.

Aspect 14. The interface system of any one of aspects 1-13, wherein the TCCS controller and/or the VES controller are configured to determine a combination of available vehicle energy and available TCCS energy.

Aspect 15. A method for interfacing between a vehicle and a transport climate control system (TCCS) that provides climate control within an internal space moved by the vehicle, the method comprising:
- a two-way communication interface communicating with a vehicle electrical system (VES) controller of a VES of the vehicle;
- the two-way communication interface communicating with a TCCS controller of the TCCS;
- a power interface interfacing with a vehicle energy source of the VES;
- the two-way communication interface distributing a TCCS status from the TCCS controller to the VES controller and/or distributing a VES status from the VES controller to the TCCS controller; and
- the power interface distributing power from the vehicle energy source to the TCCS when a VES instruction, that is based on the TCCS status, is received from the VES controller.

Aspect 16. The method of aspect 15, further comprising:
- the power interface interfacing with a TCCS energy source of the TCCS; and
- the power interface distributing power from the TCCS energy source to the VES when a TCCS instruction, that is based on the VES status, is received from the TCCS controller.

Aspect 17. The method of aspect 16, further comprising:
- when the vehicle energy source of the VES is not sufficient to satisfy a power demand for an operation of the VES, the two-way communication interface distributing the VES status from the VES controller to the TCCS controller.

Aspect 18. The method of aspect 17, further comprising:
- when the TCCS energy source is sufficient to satisfy a power demand for an operation of the TCCS, or a priority level of the operation of the VES is higher than a priority level of the operation of the TCCS, the two-way communication interface receiving the TCCS instruction from the TCCS controller.

Aspect 19. The method of any one of aspects 16-18, further comprising:
- when the TCCS energy source is not sufficient to satisfy a power demand for an operation of the TCCS, the two-way communication interface distributing the TCCS status from the TCCS controller to the VES controller.

Aspect 20. The method of aspect 19, further comprising:
  when the vehicle energy source of the VES is sufficient to satisfy a power demand for an operation of the VES, or a priority level of the operation of the TCCS is higher than a priority level of the operation of the VES, the two-way communication interface receiving the VES instruction from the VES controller.

Aspect 21. An interface system for communicating with a vehicle and an electrically powered accessory (EPA), the EPA configured to be used with at least one of the vehicle, a trailer, and a transportation container, the interface system comprising:
  a two-way communication interface that interfaces with a vehicle electrical system (VES) controller of a VES of the vehicle and an EPA controller of the EPA, and
  a power interface that interfaces with a vehicle energy source of the VES to the EPA,
  wherein the two-way communication interface is configured to distribute an EPA status from the EPA controller to the VES controller, and is configured to distribute a VES status from the VES controller to the EPA controller, and
  wherein the power interface is configured to distribute power from the vehicle energy source of the VES to the EPA when a VES instruction, that is based on the EPA status, is received from the VES controller.

Aspect 22. The interface system of aspect 21, wherein the power interface interfaces with an EPA energy source of the EPA to the VES, and
  the power interface is configured to distribute power from the EPA energy source to the VES when an EPA instruction, that is based on the VES status, is received from the EPA controller.

Aspect 23. The interface system of aspect 22, wherein when the vehicle energy source of the VES is not sufficient to satisfy a power demand for an operation of the VES, the two-way communication interface is configured to distribute the VES status from the VES controller to the EPA controller.

Aspect 24. The interface system of aspect 23, wherein when the EPA energy source is sufficient to satisfy a power demand for an operation of the EPA, or a priority level of the operation of the VES is higher than a priority level of the operation of the EPA, the two-way communication interface is configured to receive the EPA instruction from the EPA controller.

Aspect 25. The interface system of aspect 24, wherein the priority level of the operation of the EPA is determined by a criticality of preservation of a load, the load includes regulated loads and/or loads having economical value.

Aspect 26. The interface system of aspect 25, wherein the regulated loads include pharmaceuticals, meat, seafood, produce, diary, and/or frozen foods,
  wherein the loads having economical value include beverages, canned foods, paint, flowers, and/or plants.

Aspect 27. The interface system of any one of aspects 22-26, wherein when the EPA energy source is not sufficient to satisfy a power demand for an operation of the EPA, the two-way communication interface is configured to distribute the EPA status from the EPA controller to the VES controller.

Aspect 28. The interface system of aspect 27, wherein when the vehicle energy source of the VES is sufficient to satisfy a power demand for an operation of the VES, or a priority level of the operation of the EPA is higher than a priority level of the operation of the VES, the two-way communication interface is configured to receive the VES instruction from the VES controller.

Aspect 29. The interface system of any one of aspects 21-28, wherein when the power interface distributes power from the vehicle energy source of the VES to the EPA, the power interface distributes power to the EPA via electric power take off (ePTO).

Aspect 30. The interface system of any one of aspects 22-29, wherein the EPA energy source includes an auxiliary battery pack, a transport refrigerant unit (TRU) power source engine, an electric auxiliary power unit (APU) auxiliary energy storage, a solar power, a Genset, a fuel cell, a micro-turbine with a generator, and/or a liftgate energy storage.

Aspect 31. The interface system of any one of aspects 21-30, wherein the two-way communication interface includes a Controller Area Network (CAN).

Aspect 32. The interface system of any one of aspects 21-31, wherein the two-way communication interface includes telematics.

Aspect 33. A method for interfacing between a vehicle and an electrically powered accessory (EPA), the EPA configured to be used with at least one of the vehicle, a trailer, and a transportation container, the method comprising:
  a two-way communication interface communicating with a vehicle electrical system (VES) controller of a VES of the vehicle;
  the two-way communication interface communicating with an EPA controller of the EPA;
  a power interface interfacing with a vehicle energy source of the VES;
  the two-way communication interface distributing an EPA status from the EPA controller to the VES controller and/or distributing a VES status from the VES controller to the EPA controller; and
  the power interface distributing power from the vehicle energy source to the EPA when a VES instruction, that is based on the EPA status, is received from the VES controller.

Aspect 34. The method of aspect 33, further comprising:
  the power interface interfacing with an EPA energy source of the EPA; and
  the power interface distributing power from the EPA energy source to the VES when an EPA instruction, that is based on the VES status, is received from the EPA controller.

Aspect 35. The method of aspect 34, further comprising:
  when the vehicle energy source of the VES is not sufficient to satisfy a power demand for an operation of the VES, the two-way communication interface distributing the VES status from the VES controller to the EPA controller.

Aspect 36. The method of aspect 35, further comprising:
  when the EPA energy source is sufficient to satisfy a power demand for an operation of the EPA, or a priority level of the operation of the VES is higher than a priority level of the operation of the EPA, the two-way communication interface receiving the EPA instruction from the EPA controller.

Aspect 37. The method of any one of aspects 34-36, further comprising:
  when the EPA energy source is not sufficient to satisfy a power demand for an operation of the EPA, the two-way communication interface distributing the EPA status from the EPA controller to the VES controller.

Aspect 38. The method of aspect 37, further comprising:
  when the vehicle energy source of the VES is sufficient to satisfy a power demand for an operation of the VES, or a priority level of the operation of the EPA is higher than a priority level of the operation of the VES, the two-way communication interface receiving the VES instruction from the VES controller.

The terminology used in this specification is intended to describe particular embodiments and is not intended to be limiting. The terms "a," "an," and "the" include the plural forms as well, unless clearly indicated otherwise. The terms "comprises" and/or "comprising," when used in this specification, specify the presence of the stated features, integers, steps, operations, elements, and/or components, but do not preclude the presence or addition of one or more other features, integers, steps, operations, elements, and/or components.

With regard to the preceding description, it is to be understood that changes may be made in detail, especially in matters of the construction materials employed and the shape, size, and arrangement of parts without departing from the scope of the present disclosure. This specification and the embodiments described are exemplary only, with the true scope and spirit of the disclosure being indicated by the claims that follow.

What is claimed is:

1. An interface system for communicating with a vehicle and a transport climate control system (TCCS) that provides climate control within an internal space moved by the vehicle, the interface system comprising:
    a two-way communication interface that interfaces with a vehicle electrical system (VES) controller of a VES of the vehicle and a TCCS controller of the TCCS, the TCCS being independent of the vehicle, the VES being configured to supply power to operate the vehicle; and
    a power interface that interfaces with a TCCS energy source of the TCCS to the VES,
    wherein the TCCS controller is configured to determine a TCCS status, the VES controller is configured to determine a VES status, the TCCS controller is further configured to generate a TCCS instruction based on the VES status,
    wherein the two-way communication interface is configured to distribute the TCCS status from the TCCS controller to the VES controller, and is configured to distribute the VES status from the VES controller to the TCCS controller, and
    wherein the power interface is configured to distribute power from the TCCS energy source to the VES in response to the TCCS instruction that is based on the VES status and is received from the TCCS controller.

2. The interface system of claim 1, wherein the TCCS controller and/or the VES controller are configured to determine a combination of available vehicle energy and available TCCS energy.

3. The interface system of claim 1, wherein when the VES controller determines that a vehicle energy source of the VES is not sufficient to satisfy a power demand for an operation of the VES, the two-way communication interface is configured to distribute the VES status from the VES controller to the TCCS controller.

4. The interface system of claim 3, wherein when the TCCS controller determines that the TCCS energy source is sufficient to satisfy a power demand for an operation of the TCCS, or a priority level of the operation of the VES is higher than a priority level of the operation of the TCCS, the two-way communication interface is configured to receive the TCCS instruction from the TCCS controller.

5. The interface system of claim 4, wherein the priority level of the operation of the TCCS is determined by a criticality of preservation of a load, the load includes regulated loads and/or loads having economical value.

6. The interface system of claim 5, wherein the regulated loads include pharmaceuticals, meat, seafood, produce, diary, and/or frozen foods,
    wherein the loads having economical value include beverages, canned foods, paint, flowers, and/or plants.

7. The interface system of claim 1, wherein when the TCCS controller determines that the TCCS energy source is not sufficient to satisfy a power demand for an operation of the TCCS, the two-way communication interface is configured to distribute the TCCS status from the TCCS controller to the VES controller.

8. The interface system of claim 1, wherein the TCCS energy source includes an auxiliary battery pack, a transport refrigerant unit (TRU) power source engine, an electric auxiliary power unit (APU) auxiliary energy storage, a solar power, a Genset, a fuel cell, a micro-turbine with a generator, and/or a liftgate energy storage.

9. The interface system of claim 1, wherein the two-way communication interface includes a Controller Area Network (CAN).

10. The interface system of claim 1, wherein the two-way communication interface includes telematics.

11. An interface system for communicating with a vehicle and a transport climate control system (TCCS) that provides climate control within an internal space moved by the vehicle, the interface system comprising:
    a two-way communication interface that interfaces with a vehicle electrical system (VES) controller of a VES of the vehicle and a TCCS controller of the TCCS, the TCCS being independent of the vehicle, the VES being configured to supply power to operate the vehicle; and
    a power interface that interfaces with a vehicle energy source of the VES to the TCCS,
    wherein the TCCS controller is configured to determine a TCCS status, the VES controller is configured to determine a VES status, the VES controller is further configured to generate a VES instruction based on the TCCS status,
    wherein the two-way communication interface is configured to distribute the TCCS status from the TCCS controller to the VES controller, and is configured to distribute the VES status from the VES controller to the TCCS controller, and
    wherein the power interface is configured to distribute power from the vehicle energy source of the VES to the TCCS in response to the VES instruction that is based on the TCCS status and is received from the VES controller.

12. The interface system of claim 11, wherein when the power interface is configured to distribute power from the vehicle energy source of the VES to the TCCS, the power is determined based on current and forecasted power demands of the TCCS that form an energy requirement.

13. The interface system of claim 11, wherein the TCCS controller and/or the VES controller are configured to determine a combination of available vehicle energy and available TCCS energy.

14. The interface system of claim 11, wherein when the VES controller determines that the vehicle energy source of the VES is not sufficient to satisfy a power demand for an operation of the VES, the two-way communication interface is configured to distribute the VES status from the VES controller to the TCCS controller.

15. The interface system of claim 11, wherein when the VES controller determines that the vehicle energy source of the VES is sufficient to satisfy a power demand for an operation of the VES, or a priority level of the operation of the TCCS is higher than a priority level of the operation of the VES, the two-way communication interface is configured to receive the VES instruction from the VES controller.

16. The interface system of claim 15, wherein the vehicle energy source includes a charger, when the power interface distributes power from the charger to the TCCS, the power interface distributes power to the TCCS via electric power take off (ePTO) during charging the vehicle.

17. The interface system of claim 16, wherein the priority level of the operation of the TCCS is determined by a criticality of preservation of a load, the load includes regulated loads and/or loads having economical value.

18. The interface system of claim 17, wherein the regulated loads include pharmaceuticals, meat, seafood, produce, diary, and/or frozen foods,
wherein the loads having economical value include beverages, canned foods, paint, flowers, and/or plants.

19. The interface system of claim 11, wherein the two-way communication interface includes a Controller Area Network (CAN).

20. The interface system of claim 11, wherein the two-way communication interface includes telematics.

\* \* \* \* \*